United States Patent
Hyoudou et al.

(10) Patent No.: US 9,847,940 B2
(45) Date of Patent: *Dec. 19, 2017

(54) CONTROL METHOD, PACKET PROCESSING DEVICE, AND STORAGE MEDIUM

(71) Applicant: FUJITSU LIMITED, Kawasaki-shi, Kanagawa (JP)

(72) Inventors: Kazuki Hyoudou, Chofu (JP); Takeshi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,147

(22) Filed: Apr. 19, 2017

(65) Prior Publication Data

US 2017/0222925 A1 Aug. 3, 2017

Related U.S. Application Data

(63) Continuation of application No. 14/747,348, filed on Jun. 23, 2015, now Pat. No. 9,660,830.

(30) Foreign Application Priority Data

Jul. 4, 2014 (JP) .................. 2014-139018

(51) Int. Cl.
*H04L 12/741* (2013.01)
*H04L 12/721* (2013.01)

(52) U.S. Cl.
CPC ............ *H04L 45/74* (2013.01); *H04L 45/566* (2013.01)

(58) Field of Classification Search
None
See application file for complete search history.

(56) References Cited

U.S. PATENT DOCUMENTS 6,678,746 B1 * 1/2004 Russell .................. H04L 12/66
709/223
7,487,264 B2 2/2009 Pandya
(Continued)

FOREIGN PATENT DOCUMENTS

JP 2007-527167 9/2007
WO 2005/081498 A1 9/2005

OTHER PUBLICATIONS

Office Action dated Nov. 17, 2016 in related U.S. Appl. No. 14/747,348.
(Continued)

*Primary Examiner* — Chi H Pham
*Assistant Examiner* — Shick Hom
(74) *Attorney, Agent, or Firm* — Staas & Halsey LLP

(57) ABSTRACT

A control method executed by a packet processing device, the control method includes receiving, by a first processor, a received packet; identifying first processing execution information corresponding to the received packet, from among a plurality of first processing execution information, by referring to the first memory, based on packet identification information included in the received packet; and transmitting processing specification information included in the identified first processing execution information together with the received packet, to a second processor, when the processing specification information included in the identified first processing execution information specifies processing by the second processor; receiving, by the second processor, the processing specification information included in the identified first processing execution information and the received packet; and executing the processing for the received packet in accordance with second processing execution information specified by the received (Continued)

processing specification information, by referring to the plurality of second processing execution information.

15 Claims, 26 Drawing Sheets

(56) References Cited

U.S. PATENT DOCUMENTS

| | | | |
|---|---|---|---|
| 8,782,287 B2* | 7/2014 | Bouchard | H04L 45/00 |
| | | | 709/230 |
| 9,660,830 B2* | 5/2017 | Hyoudou | H04L 12/54 |
| 2002/0035623 A1* | 3/2002 | Lawande | H04L 29/12254 |
| | | | 709/221 |
| 2009/0059920 A1 | 3/2009 | Guan | |
| 2013/0031268 A1 | 1/2013 | Pope et al. | |
| 2013/0064077 A1 | 3/2013 | Kanada et al. | |

OTHER PUBLICATIONS

Notice of Allowance dated Feb. 14, 2017 in related U.S. Appl. No. 14/747,348.

* cited by examiner

FIG. 6

| ADDRESS | CONTENT | | |
|---|---|---|---|
| | MATCHING FIELD | MASK FIELD | ACTION |
| 1 | MATCHING DATA 1 | MASK DATA 1 | Add-info(1234),forward-to-CPU |
| 2 | MATCHING DATA 2 | MASK DATA 2 | Drop |
| ... | | | |
| N | MATCHING DATA N | MASK DATA N | Forward-to Port(10) |

| Ingress Port | MAC src | MAC dst | Ether Type | VLAN ID | VLAN pri | IP src | IP dst | IP proto | IP ToS | L4 sport | L4 dport |

FIG. 10

| ADDRESS | CONTENT | | | |
|---|---|---|---|---|
| | MAC ADDRESS | VLAN ID | SF | DATA (TRANSMISSION PORT/ADDRESS VALUE) |
| 1 | xx:xx:xx:xx:xx:xx | 10 | 0 | 10 (PORT NUMBER) |
| 2 | yy:yy:yy:yy:yy:yy | 20 | 1 | 1234 (ADDRESS VALUE) |
| ... | | | | |
| M | zz:zz:zz:zz:zz:zz | 10 | 0 | 11 (PORT NUMBER) |

| ADDRESS | REGISTRATION CONTENT | |
| --- | --- | --- |
| | PROCESSING CONTENT (POINTER TO ROUTINE) | ADDITION INFORMATION (PARAMETER) |
| 1 | Routine#1 | Parameter#1 |
| 2 | Routine#2 | Parameter#2 |
| ... | | |
| 1024 | Routine#1 | Parameter#1024 |
| ... | | |
| N | Routine#3 | Parameter#N |

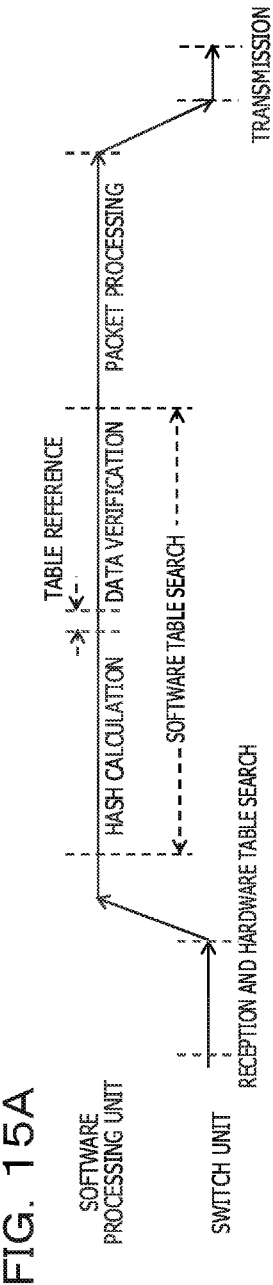
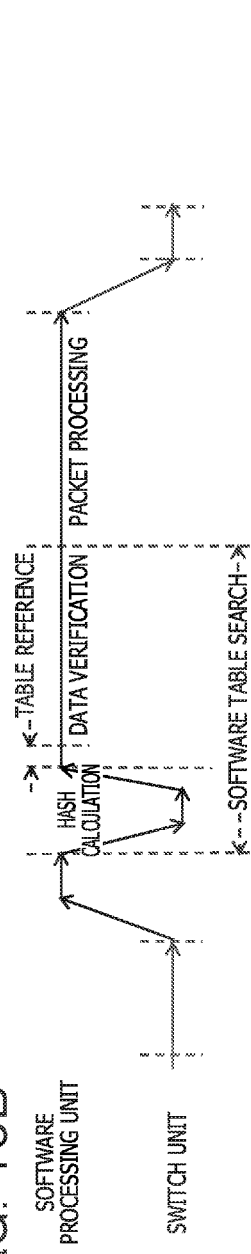
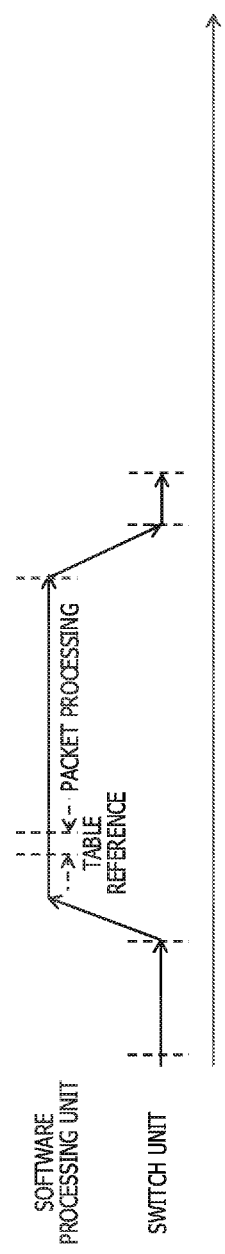

FIG. 16

| ADDRESS | RECEPTION PORT | TRANSMISSION SOURCE MAC | DESTINATION MAC | VLAN ID | DESTINATION IP | TYPE | DESTINATION UDP PORT | ACTION |
|---|---|---|---|---|---|---|---|---|
| 1 | - | - | - | - | - | - | - | - |
| ... | | | | | | | | |
| 2047 | Vlan ports | DC | DC | DC | DC | DC | DC | Send Soft w/index (2047) |
| 2048 | Vxlan ports | DC | GW_MAC | DC | GW_IP | UDP | 8472 | Send Soft w/index (2048) |

321

361

| ADDRESS | PROCESSING CONTENT | ADDITION INFORMATION |
|---|---|---|
| 1 | -- | -- |
| ... | | |
| 2047 | Std_ConvertToVXLAN | -- |
| 2048 | Std_ConvertToVLAN | -- |

| ADDRESS | PROCESSING CONTENT | ADDITION INFORMATION |
|---|---|---|
| 1 | ConvertToVXLAN_One | Parameter#1 |
|  |  |  |
| ... | | |
| 2047 | Std_ConvertToVXLAN | – |
| 2048 | Std_ConvertToVLAN | – |

FIG. 19

| ADDRESS | RECEPTION PORT | TRANSMISSION SOURCE MAC | DESTINATION MAC | VLAN ID | DESTINATION IP | TYPE | DESTINATION UDP PORT | ACTION |
|---|---|---|---|---|---|---|---|---|
| 1 | Vlan port | MAC#1 | MAC#2 | 10 | DC | DC | DC | Send Soft w/index (1) |
| 2 | - | - | - | - | - | - | - | - |
| ... | | | | | | | | |
| 2047 | Vlan ports | DC | DC | DC | DC | DC | DC | Send Soft w/index (2047) |
| 2048 | Vxlan ports | DC | GW MAC | DC | GW IP | UDP | 8472 | Send Soft w/index (2048) |

321

CONTROL METHOD, PACKET PROCESSING DEVICE, AND STORAGE MEDIUM

CROSS-REFERENCE TO RELATED APPLICATIONS

This application is a continuation of U.S. application Ser. No. 14/747,348, filed on Jun. 23, 2015, now U.S. Pat. No. 9,660,830, which is based upon and claims the benefit of priority of the prior Japanese Patent Application No. 2014-139018, filed on Jul. 4, 2014, the entire contents of which are incorporated herein by reference.

FIELD

The embodiments discussed herein are related to a control method, a packet processing device, and a storage medium.

BACKGROUND

In recent years, most of information processing devices are typically coupled to networks. Therefore, networks have become social infrastructures that are vital as the foundation of the social life and economic activity.

A network is constituted by packet processing devices such as a switch, a router, and the like. Packet processing devices other than a switch and a router include a firewall, a gateway, and a load balancer.

Recently, various communication protocols and communication standards (hereinafter collectively referred to as "protocols" unless otherwise specified) have been developed. Due to the development of the various protocols, the number of communication protocols that are to be compatible with networks is also increased. Therefore, there is a tendency in which the number of functions provided in a packet processing device is also increased.

In the case in which the functions are added to the packet processing device, when a dedicated hardware for each of the functions is provided in the packet processing device, manufacturing cost is greatly increased, and a developing time period is also increased. Due to an increase in a quantity of hardware, the power consumption is also increased. Therefore, in a quantity of hardware, the power consumption is also increased. Therefore, in the packet processing device, functions may be typically added by software processing.

Recently, virtualization of servers has been promoted, and network function virtualization (NFV) is performed by which a network function is achieved using software on a general-purpose computer in a data center. In such NFV, the function of a communication device used for a network is provided as software. In addition, the software is executed on a virtualized operating system (OS) of the general-purpose computer. Due to application of such NFV, a plurality of communication devices of different types may be integrated into a single general-purpose computer. In addition, an increase and decrease of certain functions, a change in the configuration, and the like may be dealt with flexibly.

A processing time desired for software processing is long as compared with a processing time desired for hardware processing. Therefore, typically, in the packet processing device, a basic function is executed by hardware, and functions other than the basic function are executed by software processing. Therefore, the packet processing device typically includes a part that executes processing by hardware (hereinafter referred to as "hardware processing unit") and a part that executes processing by software (hereinafter referred to as "software processing unit") for packet processing. Due to such a hardware processing unit, an average processing time desired for the packet processing may be suppressed.

In the packet processing device, typically, a processing content for a received packet is determined using a data structure called a table. Each entry of the table stores identification information such as the destination address and the packet type that are included in the packet, a processing content that corresponds to the packet identified by the identification information (transfer, discard, and processing, and the like of a packet), processing information such as parameters (output port specification, data desired for the processing, and the like). As a result, the packet processing device searches the table using identification information included in the received packet as a key, and determines and executes processing that is to be executed for the received packet.

In the above-described packet processing device including the hardware processing unit and the software processing unit, typically, the hardware processing unit determines whether processing of a packet is executed in the software processing unit. When the packet the processing of which is to be executed in the software processing unit has been received, the received packet is transferred to the software processing unit. The software processing unit receives the packet from the hardware processing unit, and performs the table search to determine a processing content for the received packet. Here, the table search and the checking of the packet content are performed in the hardware processing unit and the software processing unit. Specifically, for the software, calculation processing of a hash value and verification processing of data that are desired for the table search are heavy. In order to execute packet processing quickly in the packet processing device, it is desirable that a processing amount of table search by the software processing unit is reduced as much as possible.

In a system and a method described in Japanese National Publication of International Patent Application 2007-527167, audio, video, and other services that are sensitive to delays are dealt with by providing a wireless communication system in which a part of a media access control (MAC) function is assigned to a hardware section of a MAC layer, and a part of the MAC function is assigned to a software section of the MAC layer. For example, a response for a received packet having a larger time sensitivity related to quality of service (QoS) may be identified and processed totally in the hardware section of the MAC layer in order to reduce the delay. On the other hand, a MAC processing step in which a time sensitivity is not prioritized may be executed in the software portion of the MAC layer.

SUMMARY

According to an aspect of the invention, a control method executed by a packet processing device that includes a first memory configured to store a plurality of first processing execution information each of which includes packet identification information used to identify a packet and processing specification information indicating processing that is to be executed for a packet including the packet identification information, and a second memory configured to store a plurality of second processing execution information each of which includes processing information indicating processing that is to be executed for the packet, the control method includes receiving, by a first processor, a received packet;

identifying first processing execution information corresponding to the received packet, from among the plurality of first processing execution information, by referring to the first memory, based on packet identification information included in the received packet; and transmitting processing specification information included in the identified first processing execution information together with the received packet, to a second processor, when the processing specification information included in the identified first processing execution information specifies processing by the second processor; receiving, by the second processor, the processing specification information included in the identified first processing execution information and the received packet; and executing the processing for the received packet in accordance with second processing execution information specified by the received processing specification information, by referring to the plurality of second processing execution information stored in the second memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of an access control list (ACL) used in the second embodiment;

FIG. 8 is a diagram illustrating an example of a field in which data is verified using matching data and mask data in the received VXLAN packet;

FIG. 10 is a diagram illustrating an example of a forwarding database (FDB) used in the second embodiment;

FIG. 11 is a diagram illustrating an example of a software table;

FIGS. 15A, 15B, and 15C are flowcharts of packet transmission processing executed by a host;

FIG. 16 is a diagram illustrating an example of an ACL at the time of ACL creation;

FIG. 18 is a diagram illustrating an update example of a created software table;

FIG. 19 is a diagram illustrating an update example of a created ACL;

DESCRIPTION OF EMBODIMENTS

The embodiments are described below in detail in accordance with drawings.

First Embodiment

Figure 1:
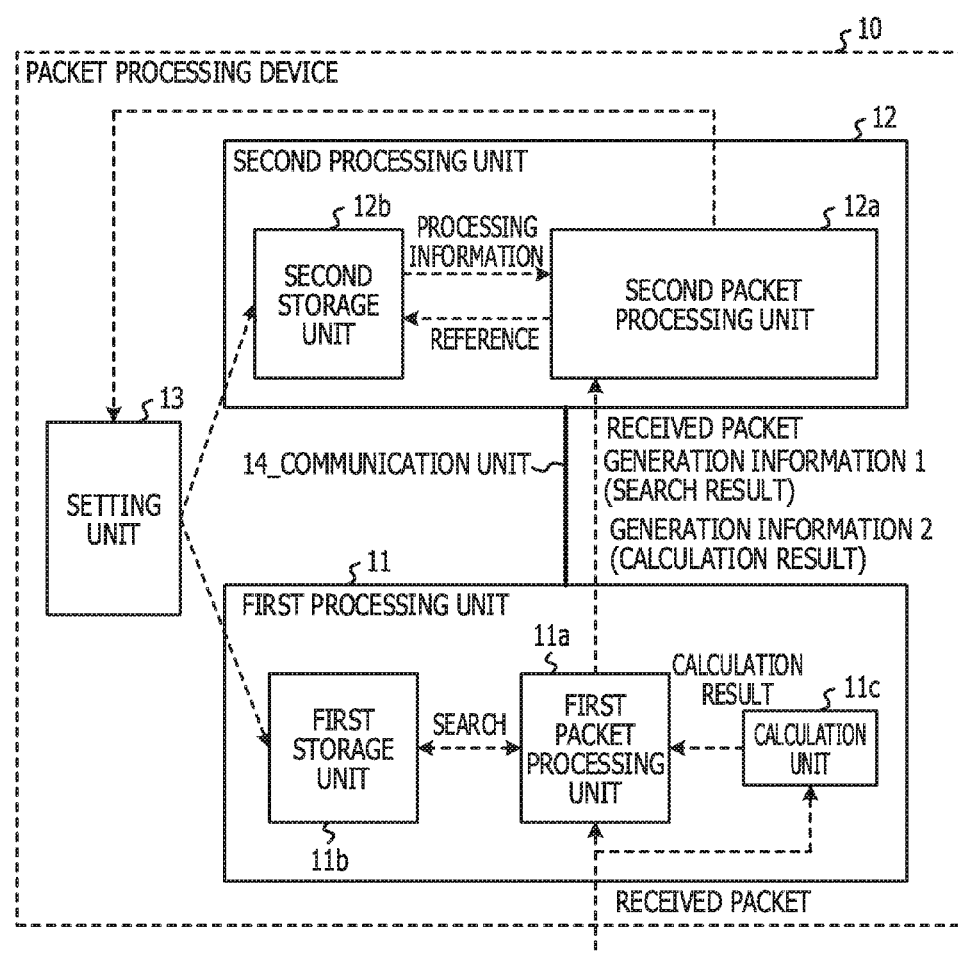
FIG. 1 is a diagram illustrating a function configuration example of a packet processing device according to a first embodiment.

FIG. 1 is a diagram illustrating a function configuration example of a packet processing device according to a first embodiment. A packet processing device 10 is coupled to a network that is not illustrated. The packet processing device 10 is a network device that executes processing that has been set in advance for a packet received through the network. As illustrated in FIG. 1, the packet processing device 10 includes a first processing unit 11, a second processing unit 12, and a setting unit 13. The first processing unit 11 and the second processing unit 12 are coupled to each other through a communication unit 14.

The communication unit 14 that connects the first processing unit 11 and the second processing unit 12 is, for example, a cable, a dedicated bus, a dedicated network, or the like. The communication unit 14 is not particularly limited to such example. The first processing unit 11 and the second processing unit 12 may be devices having different housings.

More specifically, the first processing unit 11 is, for example, a switch large scale integration (LSI), or a network interface card (NIC). The second processing unit 12 is, for example, an information processing device that includes a central processing unit (CPU). These units are merely examples, and the embodiment is not limited to such examples.

The first processing unit 11 is a configuration element that, at first, executes processing for a received packet first. The first processing unit 11 includes a first packet processing unit 11a, a first storage unit 11b, and a calculation unit 11c. The second processing unit 12 includes a second packet processing unit 12a and a second storage unit 12b.

In the first storage unit 11b of the first processing unit 11, identification information used to identify a packet and processing specification information indicating processing that is to be executed for the packet identified by the identification information are stored so as to be associated with each other.

The first packet processing unit 11a calculates a value (hereinafter referred to as a "first value") using some pieces of data of the received packet. In addition, the first packet processing unit 11*a* reads pieces of data identified by the calculated first value (here, the identification information and the processing specification information) from the first storage unit 11*b* and refers to the pieces of data. The first packet processing unit 11*a* executes processing for the received packet in accordance with the processing specification information that has been read from the first storage unit 11*b*.

When the read processing specification information specifies processing in the second processing unit 12, the first packet processing unit 11*a* generates search result information (referred to as "generation information 1 (search result)" in FIG. 1). In addition, the first packet processing unit 11*a* outputs the generated search result information to the second processing unit 12 together with the received packet. Even when first packet processing unit 11*a* has not read the processing specification information based on the first value, the first packet processing unit 11*a* generates search result information. In addition, the first packet processing unit 11*a* outputs the generated search result information to the second processing unit 12 together with the received packet.

The calculation unit 11*c* calculates a value (hereinafter referred to as "second value", and illustrated as "generation information 2 (calculation result)") in FIG. 1) using predetermined data in the received packet. The first packet processing unit 11*a* outputs the second value that has been input from the calculation unit 11*c*, to the second processing unit 12 together with the received packet and the like. The first packet processing unit 11*a* may include a plurality of calculation units used to calculate different second values, and may output the plurality of second values to the second processing unit 12.

The second storage unit 12*b* of the second processing unit 12 stores processing content information indicating a processing content that is to be executed for a received packet, and addition information desired for the processing that is to be executed (one or more parameters and the like) (the processing content information and the addition information are collectively referred to as "processing information" in FIG. 1). The second packet processing unit 12*a* executes the processing for the received packet, using the processing content information and the addition information stored in the second storage unit 12*b*.

In the embodiment, there is a correspondence relationship of "1 to 1" between the processing specification information that specifies the processing by the second processing unit 12, from among the pieces of processing specification information stored in the first storage unit 11*b*, and a set of the processing content information and the addition information stored in the second storage unit 12*b*. In the embodiment, a value indicating the storage position on the first storage unit 11*b* of the processing specification information that specifies the processing by the second processing unit 12 is managed so as to be the same as a value indicating the storage position on the second storage unit 12*b* of the processing content information and the addition information that correspond to that processing. Therefore, as the search result information, the above-described first value may be used. In addition, location information (address value, index value, or the like) directly indicating the position from which the processing specification information has been read from the first storage unit 11*b* may be used. The search result information includes, for example, information indicating whether processing specification information has been read, in addition to such information indicating the storage position.

When the first packet processing unit 11*a* has not read processing specification information, it is difficult for the second packet processing unit 12*a* to identify the position from which processing information is to be read from the second storage unit 12*b*, based on the search result information. The second value is used to read the processing information from the second storage unit 12*b*, instead of the search result information. Therefore, the second packet processing unit 12*a* refers to the search result information, and reads processing information identified by the search result information when processing specification information has been read. On the other hand, the second packet processing unit 12*a* reads processing information identified by the second value when processing specification information has not been read.

As described above, the second packet processing unit 12*a* reads the processing information that is to be referred to, from the second storage unit 12*b*, using the search result information or the second value. That is, the second packet processing unit 12*a* causes the first processing unit 11 to supply information used to read the processing information that is to be referred to, from the second storage unit 12*b*. Due to the information, the second packet processing unit 12*a* may read the processing information that is to be referred to, from the second storage unit 12*b* quicker. The processing information that is to be referred to is read from the second storage unit 12*b* quicker, so that processing for the received packet by the second packet processing unit 12*a* may be executed at high speed.

The data of the received packet, used for calculation of the first value includes, for example, a destination MAC address. The data of the received packet, used for calculation of the second value, includes, for example, a destination Internet Protocol (IP) address, a transmission source IP address, a destination L4 port number, and a transmission source L4 port number. These pieces of data are merely examples, and the embodiment is not limited to such examples.

Addition information is typically different depending on a received packet. The processing information identified by the second value is, for example, information used to execute processing for an unspecified packet, and does not include addition information. However, the addition information is identified in the process of execution of processing for the received packet by the second packet processing unit 12*a*. Therefore, in the embodiment, when the second packet processing unit 12*a* executes processing in accordance with the processing information identified by the second value, the processing information is registered to the second storage unit 12*b*, and processing specification information is registered to the first storage unit 11*b*. The setting unit 13 is a configuration element that achieves update of the first storage unit 11*b* and the second storage unit 12*b* for such registration.

The setting unit 13 obtains information desired for registration of the processing information and the processing specification information, from the second packet processing unit 12*a*. In addition, the setting unit 13 determines the position on the second storage unit 12*b*, in which the processing information is stored, the processing information is stored in the determined position. In addition, the setting unit 13 stores the processing specification information in the same position on the first storage unit 11*b* as the position that has been determined on the second storage unit 12*b*. Therefore, the setting unit 13 associates the processing specification information on the first storage unit 11b with the processing information on the second storage unit 12b, 1 to 1.

The setting unit 13 may initialize the first storage unit 11b and the second storage unit 12b, in accordance with a predetermined setting. For example, minimum processing information is registered to the second storage unit 12b at the time of the initialization. When the second storage unit 12b is initialized, an amount of processing information registered to the second storage unit 12b is increased due to execution of the processing for the received packet by the second packet processing unit 12a. When the amount of processing information that has been registered to the second storage unit 12b reaches an upper limit value, the setting unit 13 selects and deletes processing information that is to be deleted. In addition, the setting unit 13 secures a position to which processing information that is to be registered is registered.

In the embodiment, the setting unit 13 is the configuration element different from the first processing unit 11 and the second processing unit 12. However, the setting unit 13 may be included in the first processing unit 11 or the second processing unit 12.

Second Embodiment

Figure 2:
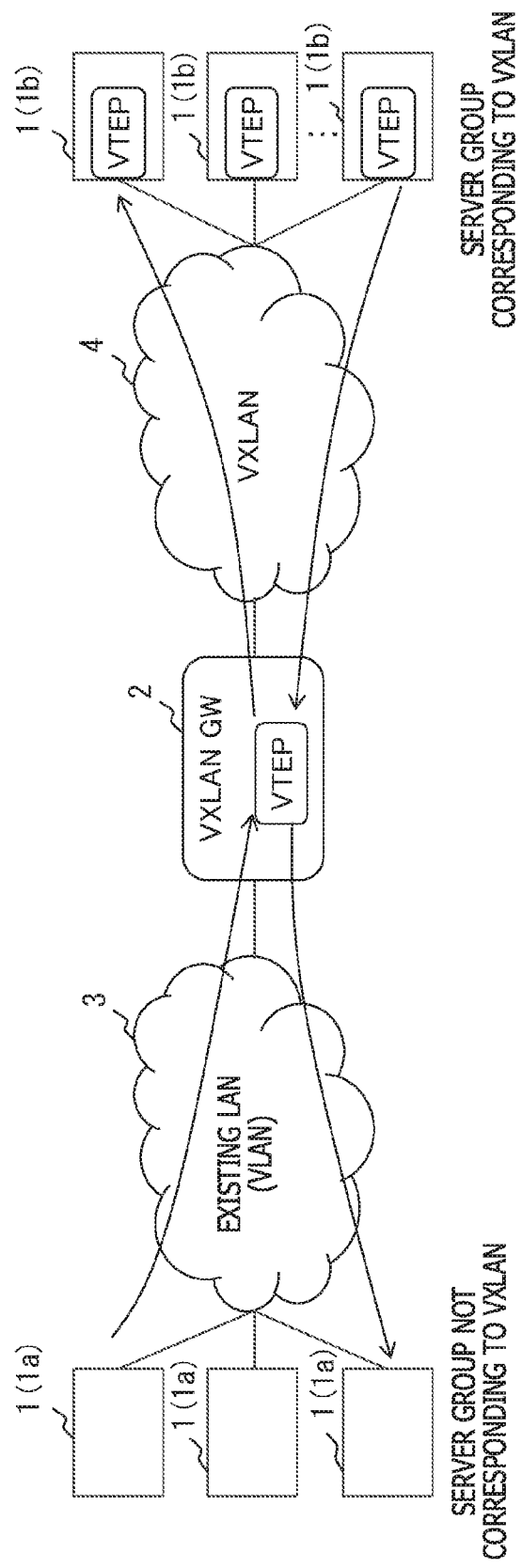
FIG. 2 is a diagram illustrating a configuration example of an information processing system built using a packet processing device according to a second embodiment.

FIG. 2 is a diagram illustrating a configuration example of an information processing system built using a packet processing device according to a second embodiment. The information processing system is, for example, a system built in a data center. In the information processing system, a plurality of servers 1 (1a and 1b) are coupled to a virtual local area network (VLAN) 3 or a virtual eXtensible LAN (VXLAN) 4.

The VLAN 3 and the VXLAN 4 are, for example, physically identical networks (LAN). In FIG. 2, the servers 1 are divided into the servers 1a that do not support the VXLAN 4 and the servers 1b that supports the VXLAN 4. The packet processing device according to the embodiment is achieved as a gateway (referred to as "VXLAN GW" in FIG. 2) 2 that allows packet communication between the VLAN 3 and the VXLAN 4. The gateway 2 includes a VXLAN tunnel end point (VTEP) function that serves as a transmission source or a transmission destination of a packet transferred through the VXLAN 4 (hereinafter collectively referred to as a "VXLAN packet"), similar to the server 1b that supports the VXLAN 4. Hereinafter, packets transferred through the VLAN 3 are collectively referred to as a "VLAN packet". When a network through which a packet is transferred is not particularly limited to such examples, the packet is simply referred to as a "packet".

Figure 3:
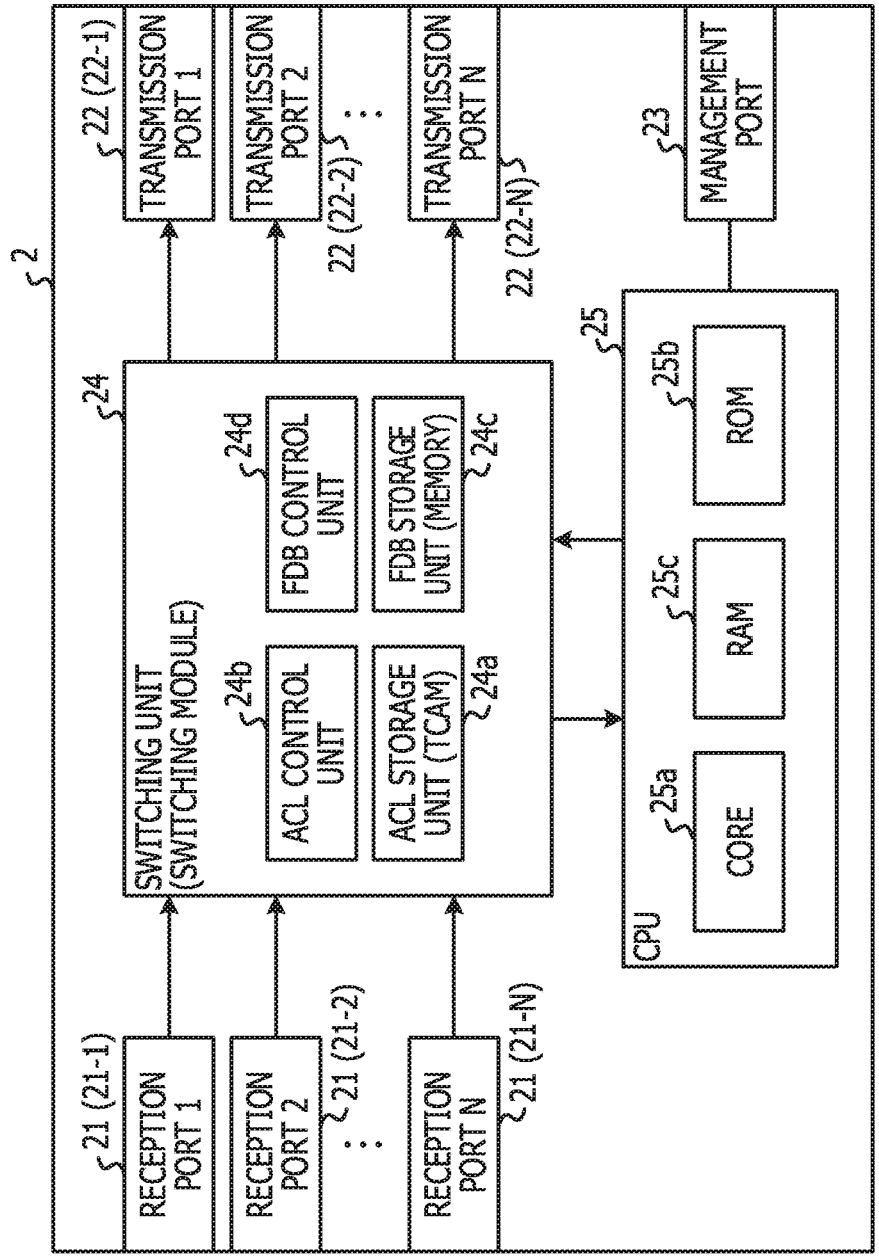
FIG. 3 is a diagram illustrating a configuration example of a gateway that is the packet processing device according to the second embodiment.

FIG. 3 is a diagram illustrating a configuration example of the gateway that is the packet processing device according to the second embodiment. As illustrated in FIG. 3, the gateway 2 includes N reception ports 21 (21-1 to 21-N), N transmission ports 22 (22-1 to 22-N), a management port 23, a switch unit (switching module) 24, and a CPU 25.

The switch unit 24 is hardware that executes processing desired for a received packet, and transmits the packet through the transmission port 22 when one of the reception ports 21 receives the packet. The switch unit 24 includes an ACL storage unit 24a, an ACL control unit 24b, an FDB storage unit 24c, and an FDB control unit 24d.

The ACL storage unit 24a is a memory that stores an ACL. As the memory used to store an ACL, a ternary content addressable memory (TCAM) is typically employed. The TCAM is a memory designed for high-speed table lookup.

The ACL is a table used to perform filtering and the like of received packets. Each entry registered to the ACL stores packet identification information used to identify a packet and information indicating processing that is to be executed for the packet matched with the packet identification information (hereinafter referred to as "processing specification information"). Processing indicated by the processing specification information includes, for example, packet transfer, packet discard, and transfer along with a change in a packet content.

The ACL control unit 24b executes processing that is to be executed for the received packet, with reference to the ACL stored in the ACL storage unit 24a. When packet transfer has been performed as the processing, the processing specification information may specify a transmission port 22 that is to be used for the packet transfer. Therefore, the ACL control unit 24b may transmit the packet through the transmission port 22 specified by the processing specification information.

The FDB storage unit 24c is a memory that stores an FDB. The FDB is a table used for packet transfer. In the FDB, for each entry (record), a correspondence relationship is defined between a destination address (MAC address or IP address, and hereinafter, for descriptive purposes, only a MAC address is used as an example) and the transmission port 22 through which the packet is transmitted. The FDB control unit 24d achieves transfer of a packet that is a target with reference to the FDB stored in the FDB storage unit 24c.

The CPU 25 functions as a software processing unit that executes software processing for a packet for which processing that is not a target in the switch unit 24 is desired. The CPU 25 includes a core 25a, a read only memory (ROM) 25b, and a random access memory (RAM) 25c.

The ROM 25b stores various programs executed by the core 25a. The programs include a program group used for software processing for the packet (hereinafter referred to as "packet processing routine group").

The management port 23 is coupled to the CPU 25. The management port 23 is a port used to control and manage the gateway 2 through an external device. The management port 23 is coupled to, for example, a network that has been built for management. Therefore, the CPU 25 controls the gateway 2 in accordance with an instruction from the external device.

Figure 4:
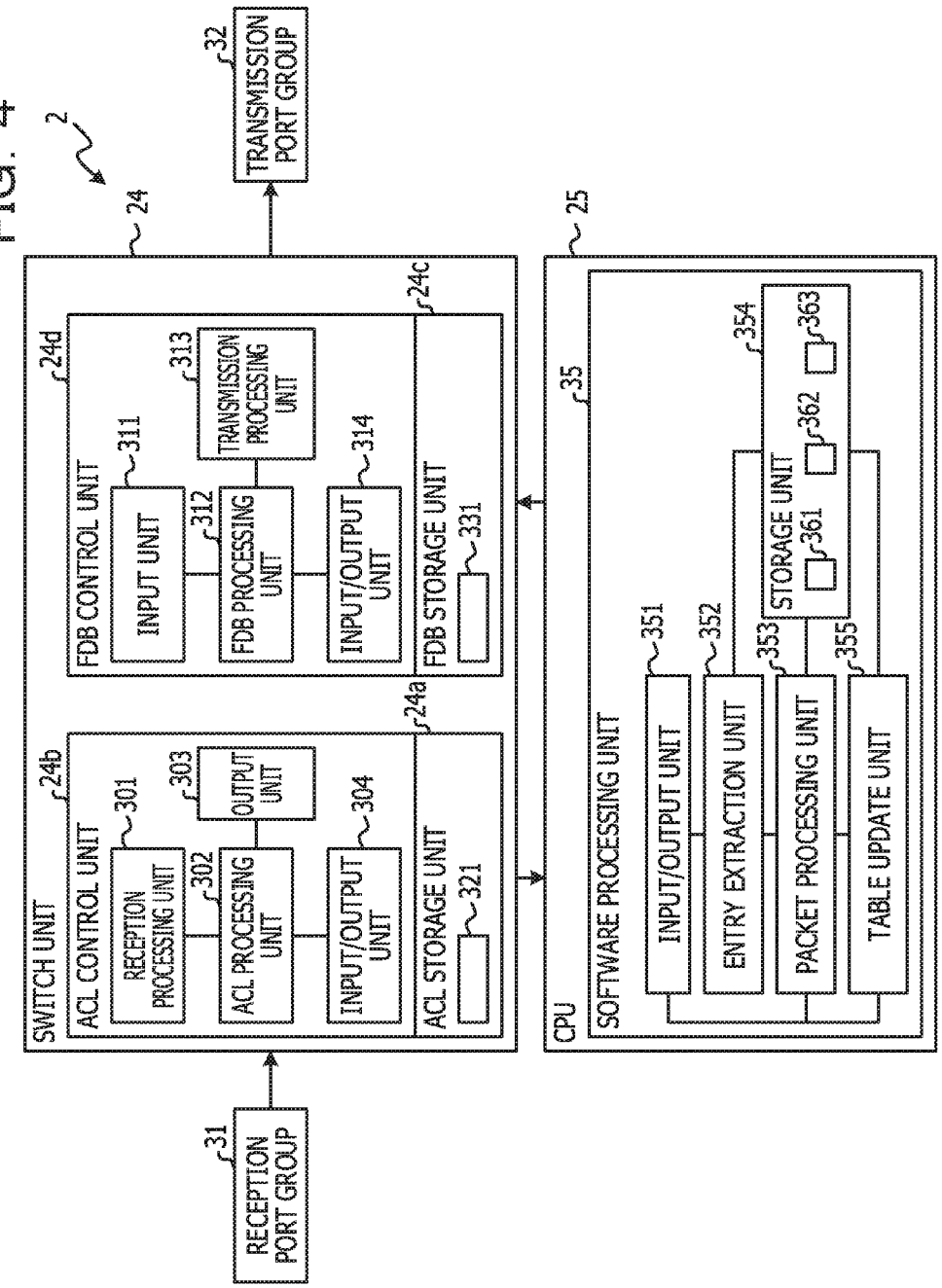
FIG. 4 is a diagram illustrating a function configuration example of the gateway that is the packet processing device according to the second embodiment.

FIG. 4 is a diagram illustrating a function configuration example of the gateway that is the packet processing device according to the second embodiment. In FIG. 4, the ACL control unit 24b and the FDB control unit 24d of the switch unit 24, and the CPU 25 are focused, and the function configuration example is illustrated.

In FIGS. 4, 321 and 331 are ACL and FDB, respectively. A reception port group 31 is an aggregate of the reception ports 21-1 to 21-N. A transmission port group 32 is an aggregate of the transmission ports 22-1 to 22-N.

As illustrated in FIG. 4, the ACL control unit 24b includes a reception processing unit 301, an ACL processing unit 302, an output unit 303, and an input/output unit 304.

The reception processing unit 301 inputs a packet that has been received at the reception port group 31 to the switch unit 24. The received packet that has been input by the reception processing unit 301 is output to the ACL processing unit 302.

The ACL processing unit 302 executes processing for the received packet that has been input from the reception processing unit 301, with reference to the ACL 321. When the received packet (here, the packet includes a received packet the content of which has been changed) is transferred using the transmission port group 32, the ACL processing unit 302 outputs the received packet to the FDB control unit 24d through the output unit 303.

Entries that have been registered to the ACL 321 includes an entry that stores processing specification information indicating software processing by the CPU 25. Therefore, the ACL control unit 24b performs input and output of data including the packet to and from the CPU 25. For example, the input/output unit 304 performs input and output of the data to and from the CPU 25.

FIG. 6 is a diagram illustrating an example of an ACL used in the second embodiment. In FIG. 6, for descriptive purposes, an address indicates identification information of an entry. Each entry registered to the ACL 321 is divided into a matching field, a mask field, and an action field.

Data stored in the matching field (matching data) is data used to identify a packet set as a target. Data stored in the mask field (mask data) is data indicating a field or bit that is not a matching target in the packet. The matching data and the mask data correspond to an example of packet identification information.

Figure 7:
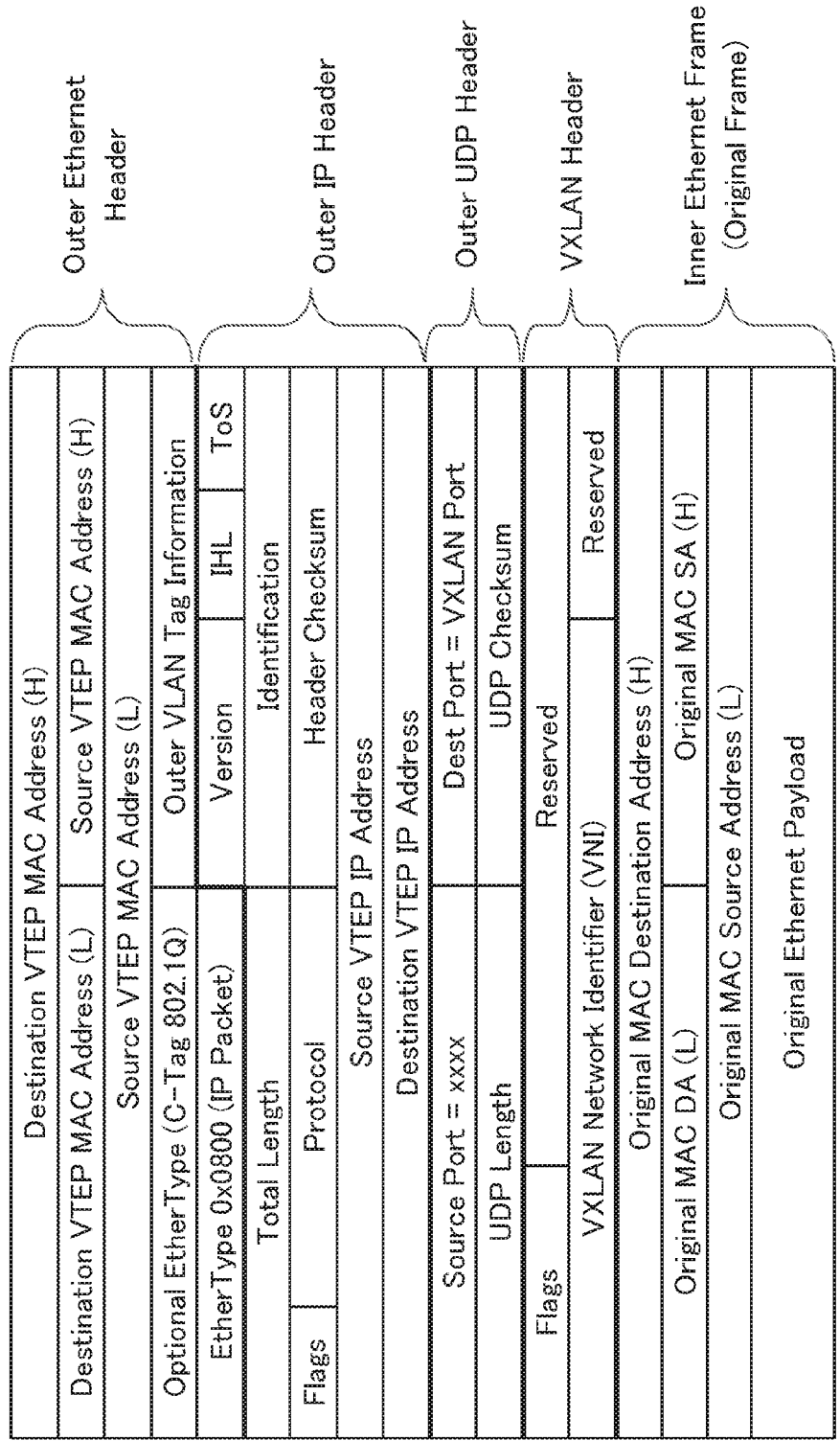
FIG. 7 is a diagram illustrating a configuration of a VXLAN packet.

FIG. 7 is a diagram illustrating a configuration of a VXLAN packet. FIG. 8 is a diagram illustrating an example of fields of a received VXLAN packet, in which data is verified using matching data and mask data. Here, data verification using matching data and mask data is specifically described with reference to FIGS. 7 and 8.

As illustrated in FIG. 7, a VXLAN packet is a packet that has been obtained by encapsulating the original Ethernet frame. For the encapsulation, an outer header is added to the original Ethernet frame. The outer header includes an outer Ethernet header, an outer IP header, an outer user datagram protocol (UDP) header, and a VXLAN header.

When the VXLAN packet described in FIG. 7 has been received, the reception processing unit 301 of the ACL control unit 24b adds identification information indicating a reception port 21 that has received the VXLAN packet (hereinafter referred to as "port number"), to the VXLAN packet. "Ingress Port" illustrated in FIG. 8 indicates a field (and a port number stored in the field) that has been added to the VXLAN packet.

The outer Ethernet header includes a destination MAC address field (fields referred to as "Destination VTEP MAC Address (H)" and "Destination VTEP MAC Address (L)" in FIG. 7), a transmission source MAC address field (fields referred to as "Source VTEP MAC Address (H)" and "Source VTEP MAC Address (L)" in FIG. 7), an Ether Type (Ethernet Type) field, and an Outer VLAN Tag Information field.

The EtherType field is a field that stores an identifier (ID) indicating the type of a communication protocol as data. "C-Tag 802.1Q" illustrated in an Optional EtherType field indicates that Institute of Electrical and Electronic Engineers (IEEE) 802.1Q is specified as a network standard. In this case, the Outer VLAN Tag Information field stores, as data, a priority code point (PCP), a canonical format indicator (CFI), and a VLAN ID. Here, the PCP is data used to specify the priority level of the VXLAN packet. In addition, the CFI is data indicating whether the MAC address has a regular format.

The outer IP header includes a type of service (ToS) field, a protocol field, a transmission source IP address field (referred to as "Source VTEP IP Address" in FIG. 7), and a destination IP address field (referred to as "Destination VTEP IP Address" in FIG. 7). The ToS field stores type data indicating the type of service. The Protocol field stores an identifier indicating the type of a communication protocol.

The outer UDP header includes a reception port field (referred to as "Source Port" in FIG. 7) and a transmission port field (referred to as "Dest Port" in FIG. 7). "Source Port=xxxx" illustrated in FIG. 7 indicates that data corresponding to a capsulated packet is stored. "Dest Port=VXLAN Port" indicates that data, used to request transfer of the VXLAN packet as is, is stored.

The VXLAN header includes a VXLAN Network Identifier (VNI) field that stores a VNI.

Here, "MAC src", "MAC dst", "EtherType", "VLAN ID", and "VLAN pri" illustrated in FIG. 8 indicate fields secured in the outer Ethernet header. The field referred to as "MAC src" stores a transmission source MAC address. The field referred to as "MAC dst" stores a destination MAC address. The field referred to as "EtherType" stores an identifier of the communication protocol. The field referred to as "VLAN ID" stores a VLAN ID. The field referred to as "VLAN pri" stores a PCP.

"IP ToS", "IP proto", "IP src", and "IP dst" illustrate in FIG. 8 indicate fields secured in the outer IP header. The field referred to as "IP ToS" stores the type data of service. The field referred to as "IP proto" stores an identifier of the communication protocol. The field referred to as "IP src" stores a transmission source IP address. The field referred to as "IP dst" stores a destination IP address.

"L4 sport" and "L4 dport" illustrated in FIG. 8 indicate fields secured in the outer UDP header. The field referred to as "L4 sport" stores data indicating a transmission source as a software communication end. The field referred to as "L4 dport" stores data indicating a destination as a software communication end.

Matching data and mask data stored in each of the entries of the ACL 321 allow matching (verification) using data of each of the fields illustrated in FIG. 8 as a target. Therefore, the matching data and the mask data allow appropriate identification of a packet that is a target.

The mask data allows verification of data stored in any field in a unit of bit. Therefore, for example, in the MAC address, the verification may be performed by removing an undesired bit. A combination of the fields (data) illustrated in FIG. 8 is an example when a VXLAN packet is used. A combination of fields is not particularly limited to such an example.

Each of the entries of the ACL 321 also includes the action field, in addition to the matching field and the mask field. The data stored in the action field (hereinafter referred to as "action data") is an example of processing specification information indicating processing that is to be executed by the ACL control unit 24b.

In FIG. 6, as the content of the action data, "Add-info (1234), forward-to-CPU", "Drop", and "Forward-to-Port (10)" are illustrated. The content is used to request the ACL control unit 24b to execute the following processing.

"Add-info (1234), forward-to-CPU" is used to request the ACL control unit 24b to execute processing in which "1234" is added to the received packet, and the packet is output to the CPU 25. Therefore, "Add-info (1234), forward-to-CPU" causes the CPU 25 to execute the software processing. "Drop" is used to request the ACL control unit 24b to discard the received packet. "Forward-to-Port (10)" is used to request the ACL control unit 24b to transmit the received packet through a transmission port 22 to which "10" has been assigned as a port number.

The numeric value of "1234" added to the received packet is index information indicating an entry that is to be extracted from a software table 361 that the CPU 25 refers to for execution of the processing. In the embodiment, as illustrated in FIG. 9, the index information is added to the received packet, for example, so as to be stored in the header.

Figure 9:
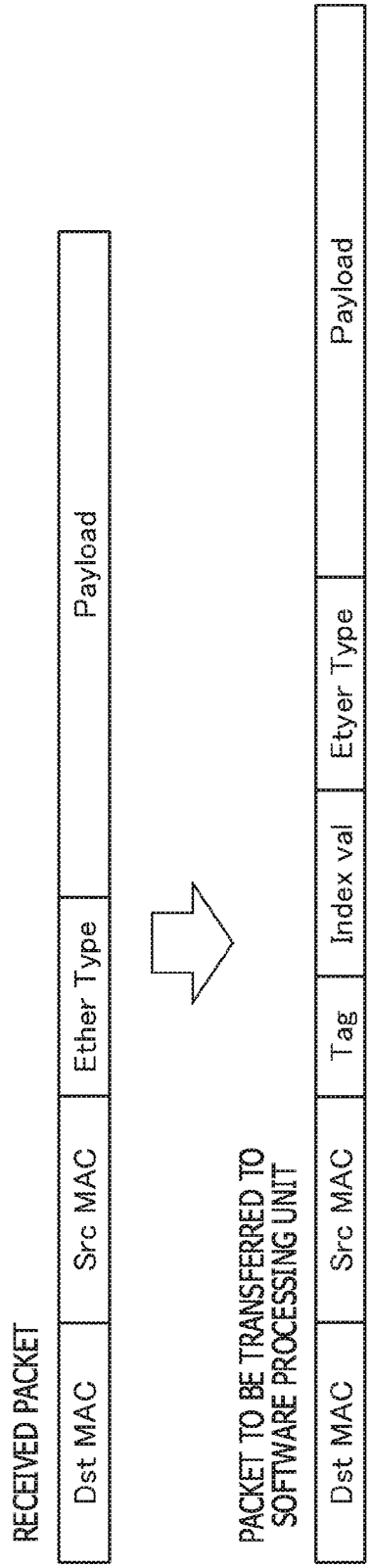
FIG. 9 is a diagram illustrating an addition example of index information to the received packet.

In the example illustrated in FIG. 9, it is assumed that the index information is added to a regular packet (Ethernet frame). The index information is referred to as "Index val" in FIG. 9. The index information is inserted between the transmission source MAC address field and the EtherType field. Information indicating the existence of the index information, which is referred to as "Tag", is added before the index information. Such addition of the index information illustrated in FIG. 9 to the received packet is an example. The addition method of index information is not particularly limited to such an example.

As illustrated in FIG. 7, when the Optional EtherType field stores the data referred to as "C-Tag 802.1Q", a field having 4 bytes is secured between the transmission source MAC address field and the EtherType field. Therefore, in the embodiment, the index information is stored in the received packet using the field. The data stored in the Optional EtherType field is "Tag" illustrated in FIG. 9, and the Optional EtherType field has 2 bytes, so that 2 bytes may be used to store the index information at maximum.

When the action data used to request the CPU 25 to execute the software processing is stored in the entry that has been identified from the received packet, the ACL processing unit 302 outputs the received packet to which the index information has been added, to the CPU 25 through the input/output unit 304. The CPU 25 executes the processing using the input received packet. In addition, the CPU 25 outputs the packet that has been obtained by the execution, to the ACL control unit 24b. The packet that has been output to the ACL control unit 24b is input to the ACL processing unit 302 through the input/output unit 304. The ACL processing unit 302 outputs the input packet to the output unit 303. As a result, the input packet is transmitted from the transmission port group 32 through the FDB control unit 24d.

As illustrated in FIG. 4, the FDB control unit 24d includes an input unit 311, an FDB processing unit 312, a transmission processing unit 313, and an input/output unit 314.

The packet that has been output from the output unit 303 of the ACL control unit 24b to the FDB control unit 24d is input to the FDB processing unit 312 through the input unit 311. The FDB processing unit 312 performs transfer of the input packet, with reference to the FDB 331. When one of the transmission ports 22 in the transmission port group 32 has been specified, the FDB processing unit 312 transmits the packet through the specified transmission port 22. The transmission of the packet is performed through the transmission processing unit 313.

It is probable that there is an entry that stores processing specification information indicating software processing by the CPU 25, from among the entries registered to the FDB 331. Therefore, the FDB control unit 24d may perform input and output of data including the packet, to and from the CPU 25. For example, the input/output unit 314 allows input and output of data to and from the CPU 25.

FIG. 10 is a diagram illustrating an example of the FDB used in the second embodiment. In FIG. 10, for descriptive purposes, an address indicates identification information of an entry, similar to FIG. 6. Each entry registered to the FDB 331 is divided into a MAC address field, a VLAN ID field, an SF field, and a data field.

A MAC address stored in the MAC address field is data verified with the destination MAC address stored in the header. A VLAN ID stored in the VLAN ID field is data verified with the VLAN ID stored in the header.

The SF field stores flag information indicating whether the software processing by the CPU 25 is to be executed. The data field stores processing information indicating a processing content that is to be executed by the FDB control unit 24d, for example, the FDB processing unit 312 or index information that is to be notified to the CPU 25.

The FDB processing unit 312 performs transfer of the received packet with reference to the FDB 331. Therefore, the processing information indicating the processing content that is to be executed by the FDB processing unit 312 is, typically, a port number indicating a transmission port 22 through which the received packet is to be transmitted. Hereinafter, for convenience, the processing information and the index information are collectively referred to as "designation information".

The flag information stored in the SF field is, for example, data of 1 bit. The flag information of the value having "0" indicates that execution of the software processing by the CPU 25 is not desired. The flag information of the value having "1" indicates that execution of the software processing by the CPU 25 is desired.

When the packet has been input from the ACL control unit 24b, the FDB processing unit 312 extracts a single entry from the FDB 331 using the destination MAC address and the VLAN ID stored in the header of the input packet. After that, the FDB processing unit 312 executes processing that is to be executed, with reference to flag information and designation information stored in the extracted entry.

When flag information of the value of "1" is stored in the entry that has been identified from the input packet, the FDB processing unit 312 outputs the input packet to which index information has been added, to the CPU 25 through the input/output unit 314, similar to the ACL control unit 24b. The CPU 25 executes the processing using the input packet. In addition, the CPU 25 outputs the packet that has been obtained by the execution, to the FDB control unit 24d. The packet that has been output to the FDB control unit 24d is input to the FDB processing unit 312 through the input/output unit 314. The FDB processing unit 312 outputs the input packet to the transmission processing unit 313, and transmits the packet through the transmission port group 32.

A software processing unit 35 that executes software processing for the packet that has been input from the switch unit 24 is achieved on the CPU 25 that executes various programs including the above-described packet processing routine group. As illustrated in FIG. 4, the software processing unit 35 includes an input/output unit 351, an entry extraction unit 352, a packet processing unit 353, a storage unit 354, and a table update unit 355.

The input/output unit 351 performs input and output of data to and from the switch unit 24. The input and output of data includes an access to the ACL storage unit 24a. When the packet is input form the switch unit 24, the input/output unit 351 outputs the input packet to the entry extraction unit 352.

The storage unit 354 stores various tables used for software processing of packets. As illustrated in FIG. 4, the various tables include a software table 361, a first processing table 362, and a second processing table 363. The storage unit 354 corresponds to, for example, a RAM 25c, or the RAM 25c and the ROM 25b illustrated in FIG. 3. The input/output unit 351, the entry extraction unit 352, the packet processing unit 353, and the table update unit 355 are achieved by causing the core 25a of the CPU 25 to execute the various programs stored in the ROM 25b.

Here, the tables 361 to 363 are specifically described with reference to FIGS. 11 to 13, respectively.

FIG. 11 is a diagram illustrating an example of the software table. The software table 361 is a table that is a target of extraction of an entry using index information as described above. As illustrated in FIG. 11, each entry registered to the software table 361 stores processing content information indicating a processing content that is to be executed, and addition information desired for the processing that is to be executed (one or more parameters and the like).

In the embodiment, as the processing content information, a pointer to a routine (sub-program) for processing that is to be executed is employed. "Routine #1", "Routine #2", and the like illustrated in FIG. 11 indicate the types of routines specified by processing content information.

The gateway 2 supports packet conversion desired between the VLAN 3 and the VXLAN 4. Information desired for the packet conversion may be treated as addition information.

For example, in the conversion from a VLAN packet to a VXLAN packet, it is desirable that an outer header is generated. It is desirable that the outer header is to store a destination MAC address, a transmission source MAC address, a destination IP address, a transmission source IP address of, and the like of a VTEP (FIG. 7). The transmission source MAC address and the transmission source IP address of the VTEP may be a MAC address and an IP address of the gateway 2, respectively. However, it is desirable that the destination MAC address and the destination IP address of the VTEP are to be different depending on a received packet. Therefore, the destination MAC address and the destination IP address of the VTEP are targets of addition information. Thus, the addition information may include a plurality of pieces of information. "Parameter #1", "Parameter #2", and the like illustrated in FIG. 11 indicate some contents of pieces of addition information that are different depending on an entry.

Each of the entry registered to the software table 361 stores the above-described processing content information and addition information. Therefore, when an entry that is to be extracted from the software table 361 has been determined, the software processing unit 35 may execute processing desired for a received packet input from the switch unit 24, by referring to the determined entry. It does not have to refer to another table and the like to obtain addition information. The addition information is obtained with reference to the determined entry without checking an entry to be referred to, so that the packet processing may be completed in a short time. Storing of addition information in an entry of the software table 361 is effective to complete the packet processing in a short time.

The first processing table 362 and the second processing table 363 are used for processing of a received packet using processing content information of an entry that does not store addition information, from among the entries registered to the software table 361.

Figure 12:
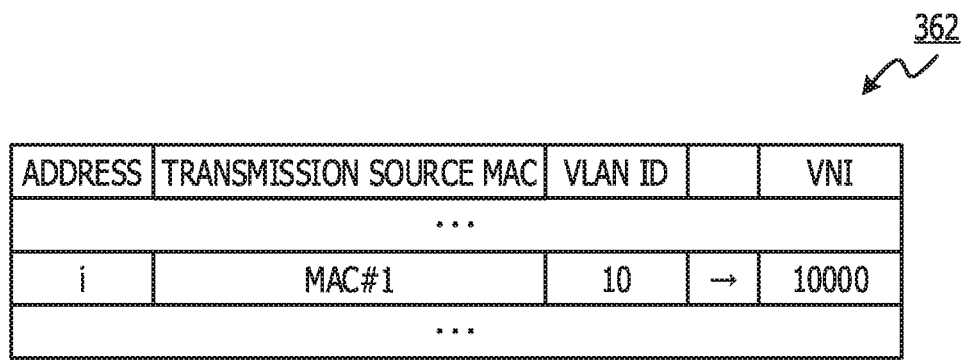
FIG. 12 is a diagram illustrating an example of a first processing table.

FIG. 12 is a diagram illustrating an example of the first processing table. FIG. 13 is a diagram illustrating an example of the second processing table. For convenience, FIGS. 12 and 13 merely illustrate content examples of a single entry that allows conversion from a VLAN packet to a VXLAN packet in the first processing table 362 and the second processing table 363, respectively.

As illustrated in FIG. 12, the entry used for conversion from a VLAN packet to a VXLAN packet in the first processing table 362 stores identification information of the received packet (here, a transmission source MAC address and a VLAN ID are merely assumed), and a VNI. Therefore, the first processing table 362 may identify a VNI based on the received packet in the conversion from a VLAN packet to a VXLAN packet.

Figure 13:
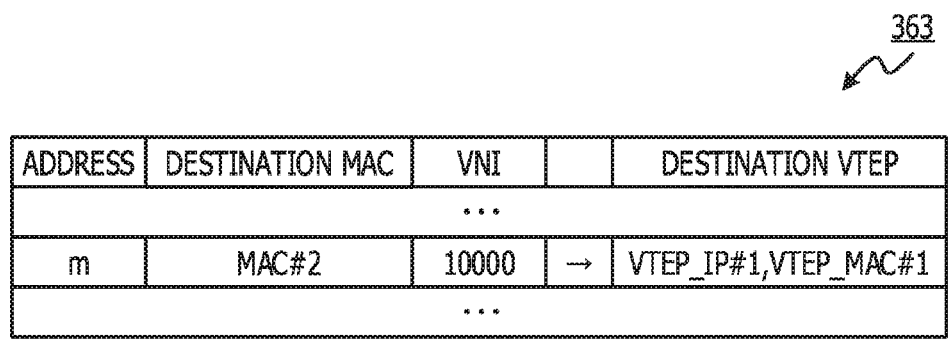
FIG. 13 is a diagram illustrating an example of a second processing table.

As illustrated in FIG. 13, the entry used for conversion from a VLAN packet to a VXLAN packet in the second processing table 363 stores identification information of the received packet (here, a transmission source MAC address is merely assumed), a VNI, and destination VTEP information. The destination VTEP information is, for example, the MAC address of a destination VTEP (referred to as "VTEP_MAC #1" in FIG. 13) and the IP address of the destination VTEP (referred to as "VTEP_IP #1" in FIG. 13). Thus, in the conversion from a VLAN packet to a VXLAN packet, the second processing table 363 may identify the MAC address and the IP address of a destination VTEP, from the received packet and a VNI of the received packet.

The VNI identified by the first processing table 362, and the MAC address and the IP address of the destination VTEP identified by the second processing table 363 may be set as addition information. Therefore, the first processing table 362 and the second processing table 363 are also used for addition of an entry to the software table 361.

Due to the identification of the data used as addition information, identification information of the received packet is determined from the first processing table 362 and the second processing table 363. The determined identification information may be used as packet identification information stored in an entry of the ACL 321. Therefore, the first processing table 362 and the second processing table 363 are also used for addition of an entry to the ACL 321.

Storing and update of the first processing table 362 and the second processing table 363 in the storage unit 354 are performed, for example, in accordance with an instruction from an external device that performs communication through the management port 23. In accordance with the instruction from the external device, storing or update of the first processing table 362 or the second processing table 363 is performed by the table update unit 355 in practice.

Returning to FIG. 4, the entry extraction unit 352 checks index information in the packet input from the input/output unit 351. In addition, the entry extraction unit 352 extracts an entry identified by the checked index information, from the software table 361. The extracted entry is output to the packet processing unit 353 together with the input packet. The input packet that has been output to the packet processing unit 353 is, for example, a received packet from which the index information and the like have been deleted. Therefore, hereinafter, a packet that has been input to the software processing unit 35 is referred to as a "received packet".

The index information added to the received packet is information indicating one of entries registered to the software table 361. Therefore, the entry extraction unit 352 extracts an entry from the software table 361 without calculation of a hash value and the like.

The packet processing unit 353 executes a routine specified by processing content information stored in the input entry, for the input received packet. The packet processing unit 353 is achieved by causing the CPU 25 to execute the above-described packet processing routine group. The packet that has been obtained by the execution of the processing is output to the switch unit 24 through the input/output unit 351.

Figure 14:
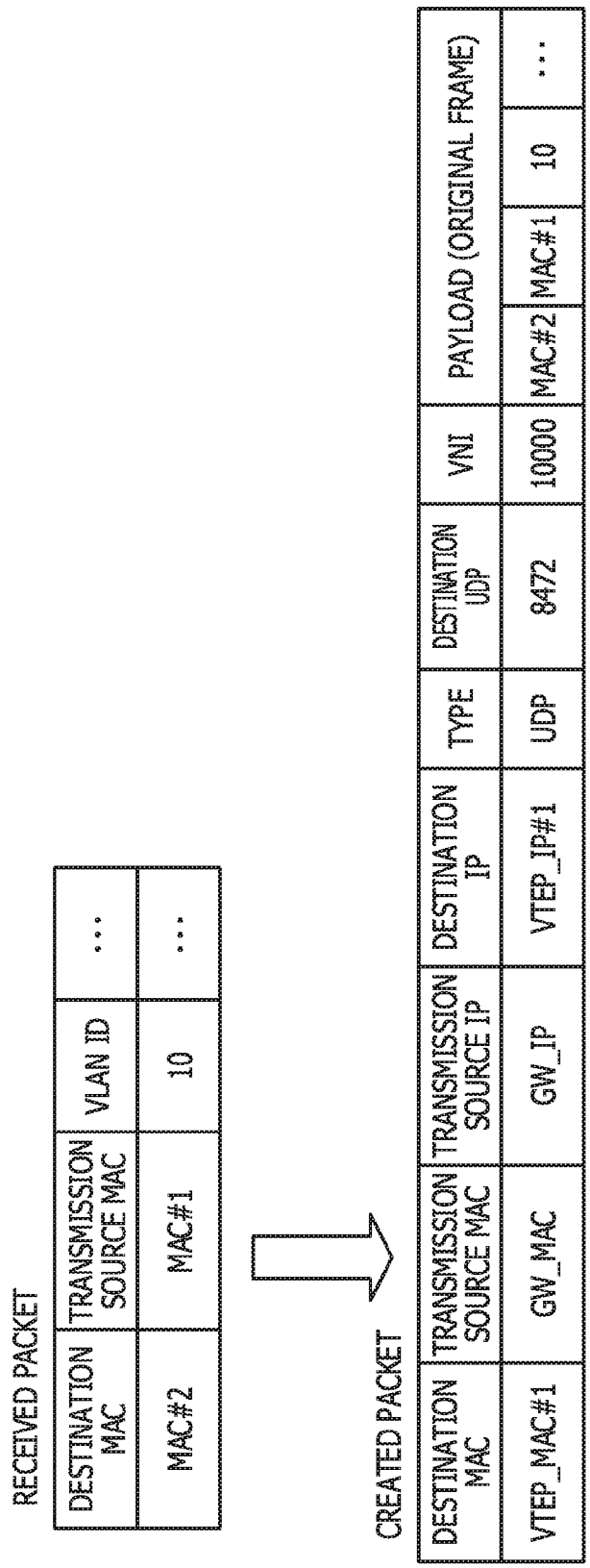
FIG. 14 is a diagram illustrating an example of a packet created from the received packet.

FIG. 14 is a diagram illustrating an example of a packet created from a received packet. In FIG. 14, an example is illustrated in which a VLAN packet is assumed as the received packet, and a VXLAN packet is created from the VLAN packet. The received packet is illustrated on the upper side of FIG. 14, and the created packet (here, the VXLAN packet) is illustrated on the lower side of FIG. 14.

The VXLAN packet is created by encapsulating the received packet (original frame) as the payload of the VXLAN packet. In an outer header added by the encapsulation, particularly, data of an important field is merely indicated.

In FIG. 14, a destination MAC address referred to as "VTEP_MAC #1", and a transmission source MAC address referred to as "GW_MAC" are pieces of data stored in fields secured in the outer Ethernet header. Here, "GW_MAC" indicates a MAC address as a VTEP of the gateway 2. Data referred to as "UDP" is also data stored in the EtherType field in the outer Ethernet header.

In FIG. 14, a transmission source IP address referred to as "GW_IP" and a destination IP address referred to as "VTEP_IP #1" are pieces of data stored in fields in the outer IP header. Here, "GW_IP" indicates an IP address as the VTEP of the gateway 2.

The data referred to as "8472" in FIG. 14 is data stored in the destination port field in the outer UDP header (destination UDP port number). The VNI referred to as "10000" is stored in the VNI field secured in the VXLAN header.

All pieces of data other than the transmission source MAC address and the transmission source IP address from among the above-described pieces of data stored in the added outer header may be addition information targets. The data that may be the addition information target is stored in the first processing table 362 or the second processing table 363. Therefore, the first processing table 362 and the second processing table 363 are used to create addition information when an entry is added to the software table 361.

As described above, the received packet that has been input through the input/output unit 351 is processed by the entry extraction unit 352 and the packet processing unit 353. Due to the execution of the processing for the packet by the entry extraction unit 352 and the packet processing unit 353, a time desired for the processing is greatly reduced as compared with that of existing processing. The reduction in a time desired for the processing is specifically described with reference to FIGS. 15A to 15C.

FIGS. 15A, 15B, and 15C are diagrams illustrating a change in a processing time desired for packet processing by the software processing unit. Here, three cases are illustrated as examples. In addition, the vertical axis indicates the switch unit in addition to the software processing unit, as a configuration element related to the packet processing. The horizontal axis indicates a time.

FIG. 15A illustrates existing processing in which hash calculation is performed for extraction of an entry from a software table (referred to as "existing processing in which hash calculation is performed using software" in FIG. 15A). FIG. 15B indicates existing processing in which the switch unit is caused to perform hash calculation for extraction of an entry (referred to as "existing processing in which the hash calculation is offloaded to the switch unit" in FIG. 15B). FIG. 15C illustrates a case to which the embodiment is applied.

The switch unit 24, the software processing unit 35 (the CPU 25), and the software table 361 according to the embodiment are not used in the existing processing. Therefore, it is not appropriate that symbols are assigned to a switch unit, a software processing unit, and a software table for description of each of the pieces of existing processing. Here, symbols are not assigned to the switch unit, the software processing unit, and the software table in order to avoid confusion due to the presence or absence of the symbols.

In the existing processing illustrated in FIG. 15A, when a packet has been input from the switch unit, the software processing unit perform software table search that causes overhead before executing packet processing for the received packet. After the software processing unit has executed the packet processing, the software processing unit outputs the packet that has been obtained by the packet processing, to the switch unit, and causes the switch unit to perform transmission of the packet. The flow after the execution of the packet processing is same as that of the existing processing illustrated in FIG. 15B and the embodiment illustrated in FIG. 15C.

The software table search includes calculation of a hash value using data of the received packet (referred to as "hash calculation" in FIG. 15A), extraction of an entry from the software table using the calculated hash value (referred to as "table reference" in FIG. 15A), and data verification for checking whether the extracted entry is appropriate entry (referred to as "data verification" in FIG. 15A). When it is determined that an appropriate entry has not been extracted as a result of the data verification, the software table search is performed again.

Even in the existing processing illustrated in FIG. 15B, the processing executed by the software processing unit as the overhead caused by the software table search includes the hash calculation, the table reference, and the data verification. When it is determined that an appropriate entry has not been extracted as a result of the data verification, the software table search is performed again similar to the existing processing illustrated in FIG. 15A. However, the processing time desired for the software table search is reduced as compared with the existing processing illustrated in FIG. 15A by causing the switch unit to perform the hash calculation.

In the embodiment illustrated in FIG. 15C, the software processing unit may extract a single entry from the software table appropriately using index information in the input received packet. Therefore, hash calculation does not have to be performed, and data verification also does not have to be performed. That is, in the software table search, it is only sufficient to perform table reference. As a result, even as compared with the existing processing illustrated in FIG. 15B, the processing time from input of the received packet from the switch unit to completion of the packet processing is greatly reduced. Therefore, deletion of the overhead, that is, a reduction of the processing time by the overhead portion efficiently reduces a time desired to complete the packet processing.

As described above, the table update unit 355 performs storing or update of the first processing table 362 or the second processing table 363 in the storage unit 354, in accordance with an instruction from the external device. The table update unit 355 performs creation and update of the software table 361. The table update unit 355 performs at least update of the ACL 321 stored in the switch unit 24.

Operations of creation and update of the software table 361 by the table update unit 355, and an operation of update of the ACL 321 or the FDB 331 are specifically described with reference to FIGS. 16 to 19. Here, for convenience, the ACL 321 is merely assumed as an update target between the ACL 321 and the FDB 331. The ACL 321 is a target of creation and update for the table update unit 355. The FDB 331 is a table to which an entry is added by learning of the FDB processing unit 312, so that the FDB 331 is only an update target for the table update unit 355.

Figure 17:
FIG. 17 is a diagram illustrating an example of a software table at the time of software table creation.

FIG. 16 is a diagram illustrating an example of an ACL at the time of creation. FIG. 17 is a diagram illustrating an example of a software table at the time of creation. In FIGS. 16 and 17, "-" indicates that data does not exist. It is assumed that the number of entries in each of the ACL 321 and the software table 361 is "2048". This is why it is assumed that an entry of the ACL 321 and the corresponding entry of the software table 361 have a correspondence relationship of "1 to 1". In such assumption, the address value of an entry may be used as index information, so that index information may not be stored in the entry.

Here, "reception port", "transmission source MAC", "destination MAC", and the like illustrated in FIG. 16 indicate field examples in which data is verified using matching data and mask data. As the received packet, a VLAN packet and a VXLAN packet are assumed.

Here, "reception port" indicates the field referred to as "Ingress Port" in FIG. 8. In addition, "transmission source MAC", "destination MAC", "VLAN ID", and "type" indicate fields secured in the outer Ethernet header. In addition, "destination IP" indicates a field secured in the outer IP header. In addition, "destination UDP port" indicates a field secured in the outer UDP header.

"DC" as which the content of field data is referred to is an abbreviation of "Don't Care", and indicates that the field is not a data verification target. For example, "Send Soft w/index (2047)" as which the content of action data is referred to indicates processing in which "2047" used as index information is added to the received packet, and the packet is output to the CPU 25.

In the embodiment, as illustrated in FIG. 16, for example, at the time of creation of the ACL, data is stored merely in two entries having the address values "2047" and "2048". This is why only conversion processing from a VLAN packet to a VXLAN packet and conversion processing from a VXLAN packet to a VLAN packet are used as examples. The number of entries each of which stores data in the ACL 321, that is, the number of entries registered to the ACL 321 is determined depending on assumed processing.

On the other hand, as illustrated in FIG. 17, at the time of creation of the software table, data is stored merely in two entries having the address values "2047" and "2048" in the software table 361. As a result, from the time of the creation of the software table, an entry of the ACL 321 and the corresponding entry of the software table 361 have a correspondence relationship of "1 to 1".

"Std_ConvertToVXLAN" illustrated in the entry having the address value "2047" as processing content information indicates a routine in which a VLAN packet is converted to a VXLAN packet (hereinafter referred to as "standard VXLAN conversion routine"). "Std_ConvertToVLAN" illustrated in the entry having the address value "2048" as processing content information indicates a routine in which a VXLAN packet is converted to a VLAN packet (hereinafter referred to as "standard VLAN conversion routine"). These two routines are included in the above-described packet processing routine group.

In the two entries having the address values "2047" and "2048", addition information is not stored. This is why the standard VXLAN conversion routine and the standard VLAN conversion routine are routines in which the processing for packet conversion is executed with reference to the first processing table 362 and the second processing table 363.

When the first processing table 362 and the second processing table 363 are referred to, the processing time is increased as compared with a case in which the two tables 362 and 363 are not referred to. In the embodiment, as illustrated in FIG. 16, at the time of creation of the ACL, pieces of data that cause the two tables 362 and 363 to be referred to are stored in the two entries having the address values "2047" and "2048" in the ACL 321. This is caused by the following reasons.

In the ACL 321, the entries are referred to in order from a smaller address value. The entry reference is completed by checking an entry that is to be a target. Therefore, when the data is stored in the two entries having the address values "2047" and "2048" in the ACL 321, so that the priority levels of processing with reference to the two entries are set at the lowest level.

As a result of setting of the priority levels as the lowest level, the execution of processing by the packet processing unit 353 with reference to the first processing table 362 and the second processing table 363 is suppressed to a minimum. Thus, it is avoided that a time until completion of the packet processing is increased unnecessarily. Therefore, in the embodiment, data is stored in the two entries having the address values "2047" and "2048" in the ACL 321.

Addition information desired for processing of the received packet is obtained by execution of processing with reference to the first processing table 362 and the second processing table 363. In addition, packet identification information that is to be stored in an entry of the ACL 321 is obtained. Therefore, the addition information and the packet identification information are input from the packet processing unit 353 to the table update unit 355, and the table update unit 355 performs addition of an entry to the software table 361 and addition of an entry to the ACL 321.

FIG. 18 is a diagram illustrating an update example of a created software table. FIG. 19 is a diagram illustrating an update example of a created ACL. In the update examples illustrated in FIGS. 18 and 19, a case is used as an example, in which the packet processing unit 353 executes processing with reference to the entry having the address value of "2047" in the software table 361.

As illustrated in FIGS. 18 and 19, addition of an entry, that is, storing of data in the entry is performed on an entry having the address value "1" in the software table 361 and the ACL 321. This is merely an example, and an entry that stores data may be selected from entries having address values that are smaller than the address value "2047".

The entry having the address value "1" in the software table 361 stores addition information that has been obtained from the packet processing unit 353. When the packet processing unit 353 generates the VXLAN packet as illustrated in FIG. 14, the destination MAC address, the destination IP address, the transmission port information, and the like are stored as addition information. "ConvertToVXLAN_One" as the processing content information in FIG. 18 indicates a routine in which the VLAN packet is converted into a VXLAN packet with reference to the addition information.

The entry having the address value "1" in the ACL 321 stores the packet identification information that has obtained from the packet processing unit 353, and action data indicating processing in which the received packet to which index information having the value "1" has been added is output to the CPU 25 (referred to as "Send Soft w/index (1)" in FIG. 19).

As described above, when the packet processing unit 353 has executed the processing with reference to the first processing table 362 and the second processing table 363, the table update unit 355 adds an entry to the software table 361 and the ACL 321. The action data of the entry that has been added to the ACL 321 is caused to include index information indicating the entry that has been added to the software table 361 has been added. Therefore, the table update unit 355 achieves a correspondence relationship of "1 to 1" between an entry of the software table 361 and the corresponding entry of the ACL 321.

When the software table 361 and the ACL 321 have been updated as described above, execution of the processing by the packet processing unit 353 with reference to the first processing table 362 and the second processing table 363 is suppressed to a minimum. Therefore, the time desired for the processing of the received packet through the CPU 25 is also suppressed to a minimum or to a level close to the minimum level.

The number of entries allowed to be registered to the ACL 321 is limited. Therefore, when an entry is to be added under a condition in which data is stored in all entries in the ACL 321, the table update unit 355 rewrites data on an entry that has been selected from the entries other than the entries having the address values "2047" and "2048". The table update unit 355 rewrites data even on an entry of the software table 361, which has the same address value as the entry on which the data is rewritten in the ACL 321. Therefore, even under the condition in which data is stored in all entries, the table update unit 355 updates the ACL 321 and the software table 361. A method in which an entry on which data that is to be rewritten is selected in the ACL 321 may be the same as an existing method.

Figure 5:
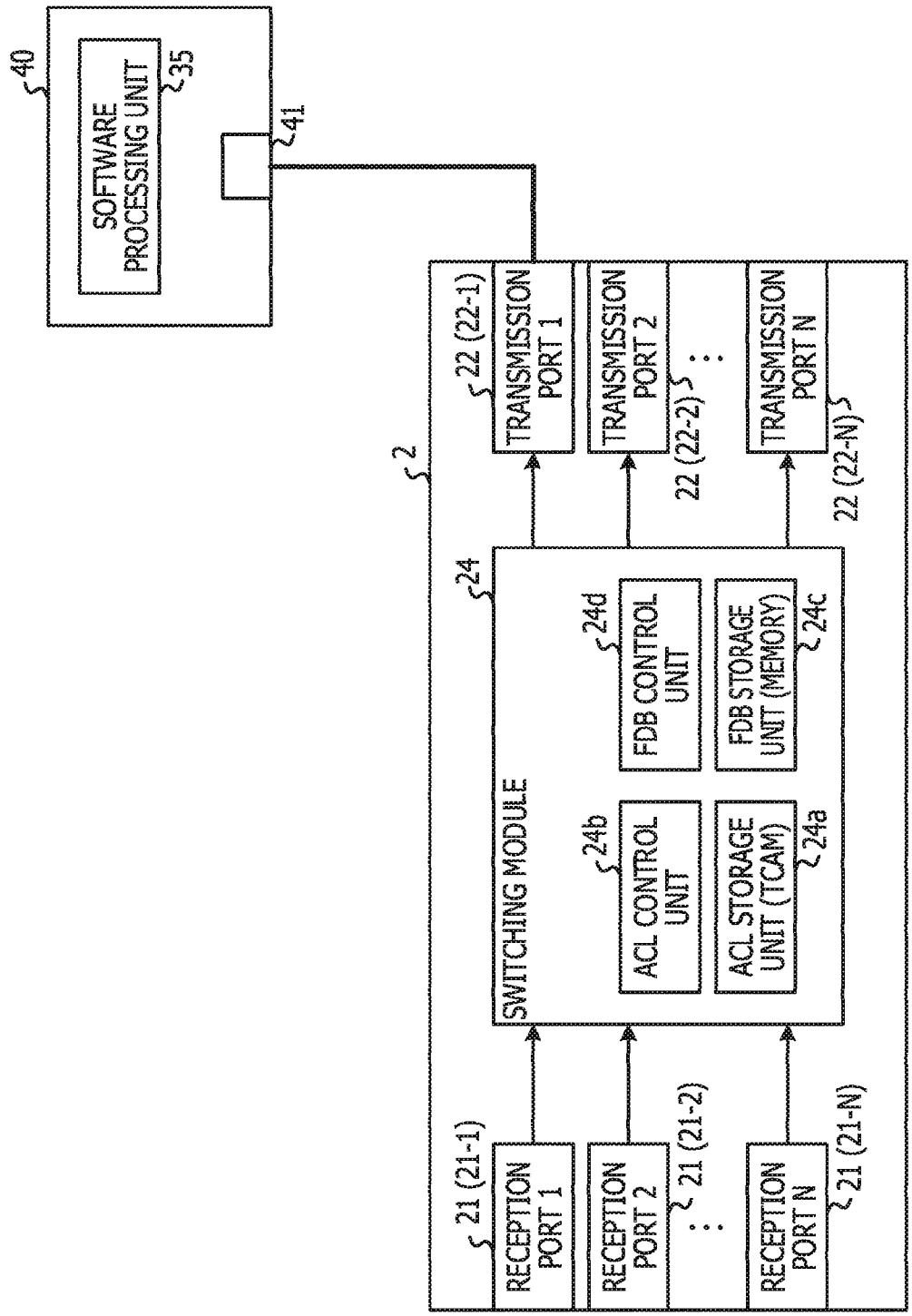
FIG. 5 is a diagram illustrating a further configuration example of the gateway that is the packet processing device according to the second embodiment.

In the embodiment, the CPU 25 that achieves the software processing unit 35 having the above-described function configuration is provided in the gateway 2. However, as illustrated in FIG. 5, the software processing unit 35 may be provided in an external device 40 that may communicate with the gateway 2. In FIG. 5, the transmission port 22-1 of the gateway 2 is used as a port specific to data transmission to the external device 40, and the transmission port 22-1 is coupled to a reception port 41 of the external device 40. A transmission port specific to data transmission to the gateway 2 of the external device 40 is not illustrated. The transmission port is coupled to, for example, the reception port 21 specific to data reception from the external device 40.

Figure 20:
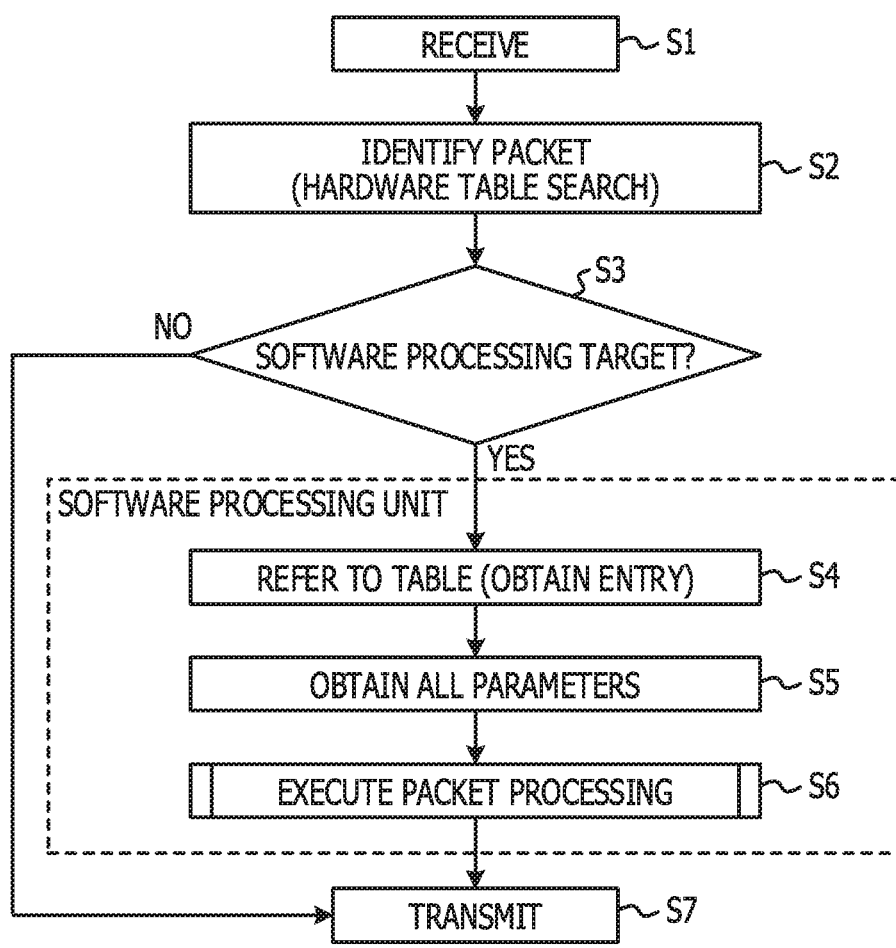
FIG. 20 is a flowchart illustrating an operation at the time of reception of a packet by the gateway that is the packet processing device according to the second embodiment.

FIG. 20 is a flowchart illustrating an operation at the time of reception of a packet in the gateway that is the packet processing device according to the second embodiment. An operation of the gateway 2 when the packet is received is described below in detail with reference to FIG. 20. Here, for convenience, it is assumed that merely the ACL control unit 24b of the switch unit 24 requests the CPU 25 to execute packet processing. An operation of the CPU 25 is described by reflecting the configuration elements of the software processing unit 35.

A packet is received by one of the reception ports 21 (S1), and is output to the switch unit 24. In the ACL control unit 24b of the switch unit 24, the packet is input through the reception processing unit 301, and for example, the reception processing unit 301 adds a port number to the input received packet. The ACL processing unit 302 of the ACL control unit 24b performs searches the ACL 321 using the received packet to which the port number has been added. In addition, the ACL processing unit 302 extracts an entry corresponding to the received packet from the ACL 321 (S2).

The ACL processing unit 302 checks action data of the extracted entry. When the action data indicates output of the received packet to the software processing unit 35 (the CPU 25) (S3: YES), the ACL processing unit 302 outputs the received packet to which index information in the action data has been added, to the CPU 25. On the other hand, when the action data does not indicate output of the received packet to the software processing unit 35 (S3: NO), the ACL processing unit 302 executes processing for the received packet in accordance with the action data. In FIG. 20, it is assumed that the received packet is transmitted from the transmission port 22. The processing of the received packet also includes packet discard.

The received packet that has been output from the switch unit 24 is input through the input/output unit 351 of the software processing unit 35, and delivered to the entry extraction unit 352. The entry extraction unit 352 reads the index information from the input received packet. In addition, the entry extraction unit 352 extracts an entry indicating the extracted index information from the software table 361 (S4).

The entry extraction unit 352 reads processing content information and addition information stored in the extracted entry after having extracted the entry. In addition, the entry extraction unit 352 delivers the read processing content information and addition information to the packet processing unit 353, together with the received packet (S5). When addition information is not stored in the extracted entry, for example, processing content information is merely delivered to the packet processing unit 353.

The packet processing unit 353 executes a routine indicated by the processing content information, and executes packet processing for the received packet (S6). The packet that has been obtained by executing the packet processing is output to the ACL control unit 24b of the switch unit 24 through the input/output unit 351. In addition, the packet is transmitted from the transmission port 22 through the FDB control unit 24d (S7).

Figure 21:
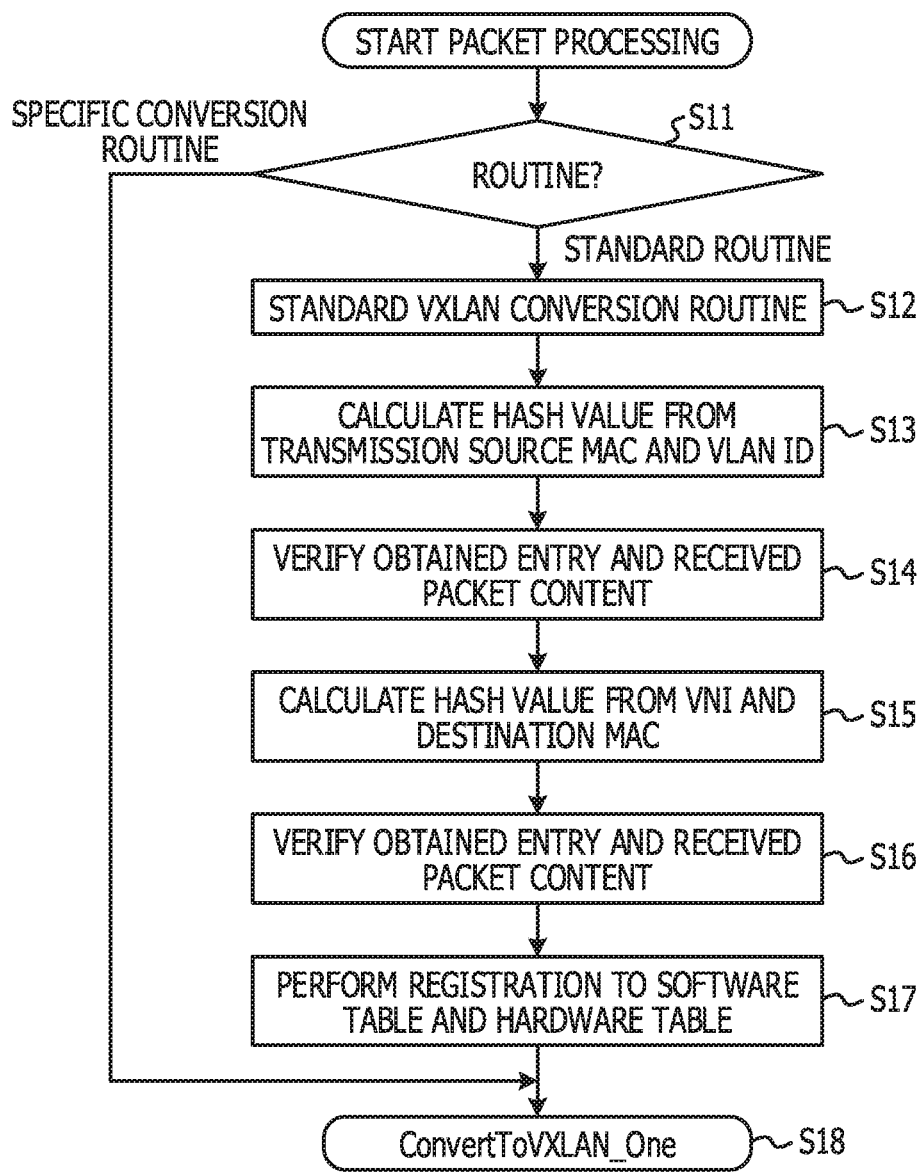
FIG. 21 is a flowchart illustrating packet processing.

FIG. 21 is a flowchart illustrating the packet processing executed as the above-described processing of S6. Here, for convenience, a flow of the processing is described by reflecting two routines in which a VLAN packet is converted to a VXLAN packet. The two routines are the standard VXLAN conversion routine and the "ConvertToVX-LAN_One". In FIG. 21, the standard VXLAN conversion routine is also referred to as a "standard routine". The "ConvertToVXLAN_One" is also referred to as a "specific conversion routine". An operation of the packet processing unit 353 is described below in detail with reference to FIG. 21.

As described above, the packet processing unit 353 executes a routine indicated by the processing content information in the packet processing routine group. Therefore, the packet processing unit 353 determines the type of the routine indicated by the processing content information that has input from the entry extraction unit 352 (S11). When the routine indicated by the processing content information is determined as the standard VXLAN conversion routine in S11, the standard VXLAN conversion routine is started up in S12.

The packet processing unit 353 that has started the standard VXLAN conversion routine calculates a hash value used to extract an entry from the first processing table 362, using the transmission source MAC address, the VLAN ID, and the like in the received packet (S13). After that, the packet processing unit 353 reads the entry indicated by the calculated hash value from the first processing table 362. In addition, the packet processing unit 353 performs data verification using identification information stored in the read entry (S14). When the entry indicated by the hash value has been determined as the entry corresponding to the received packet based on the data verification, the flow proceeds to processing of S15.

In S15, the packet processing unit 353 calculates a hash value used to extract an entry from the second processing table 363 using the data that has been extracted from the first processing table 362 (for example, the VNI, the destination MAC address, and the like). After that, the packet processing unit 353 reads the entry indicated by the calculated hash value from the second processing table 363, and performs data verification using identification information stored in the read entry (S16). When the entry indicated by the hash value has been determined as the entry corresponding to the received packet based on the data verification, the flow proceeds to processing of S17.

When there exists a plurality of entries that are to be targets, the data verification in S14 and S16 is repeated until the entry corresponding to the received packet is identified or until the absence of the corresponding entry is determined. Therefore, when the flow proceeds to S17, packet identification information that is to be stored in an entry added to the ACL (referred to as "hardware table" in FIG. 21) 321, and addition information that is to be stored in an entry added to the software table 361 are determined. Therefore, in S17, the packet processing unit 353 performs registration of the added entry to the software table 361 and the ACL 321 using the addition information and the packet identification information. After that, the packet processing unit 353 ends the standard VXLAN conversion routine, and starts the "ConvertToVXLAN_One" (S18).

The packet processing unit 353 that has started the "ConvertToVXLAN_One" generates the VXLAN packet as illustrated in FIG. 14 using the addition information. In addition, the packet processing unit 353 outputs the generated VXLAN packet to the ACL control unit 24b of the switch unit 24. The packet processing unit 353 ends the packet processing after having output the generated VXLAN packet to the ACL control unit 24b.

The generation method of the VXLAN packet after the addition information has been obtained is basically the same as the existing method. Therefore, in FIG. 21, the generation processing of the VXLAN packet is omitted. In the standard VXLAN conversion routine, by assuming that the "ConvertToVXLAN_One" is executed next, a minimum function to obtain information desired for the execution (addition information) and a minimum function to obtain packet identification information are specified.

Figure 22:
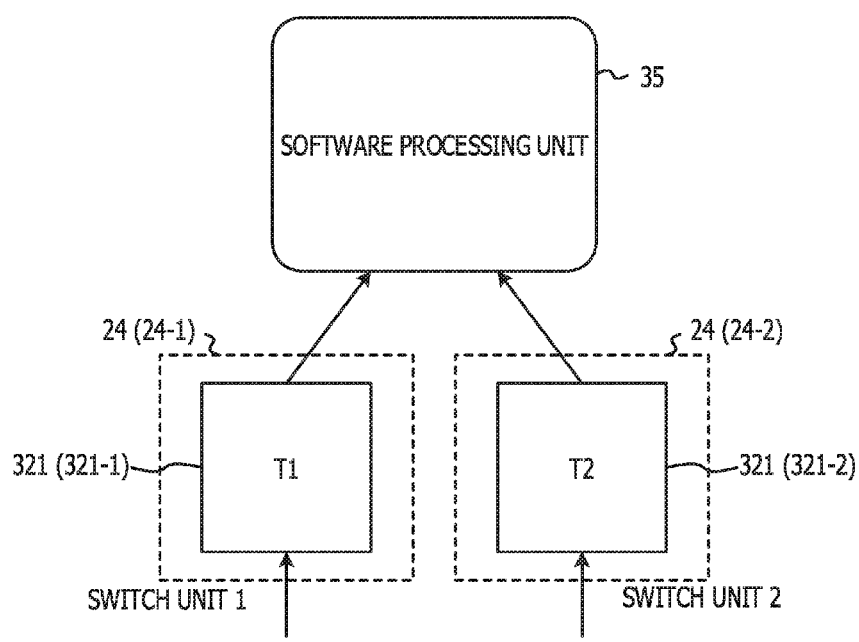
FIG. 22 is a diagram illustrating a switch unit according to a first modification.
Figure 23:
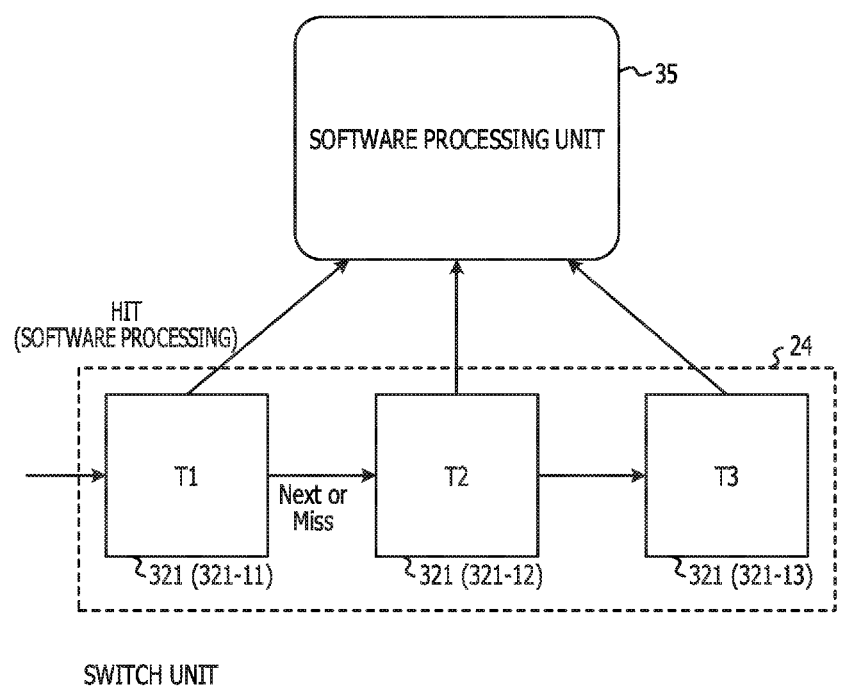
FIG. 23 is a diagram illustrating a switch unit according to a second modification.

In the above-described description, as the table that causes the software processing unit 35 to execute the packet processing, the ACL 321 is used. However, a table other than the ACL 321 and the FDB 331 may be employed. The single software processing unit 35 (the CPU 25) and the single switch unit 24 are provided. However, as illustrated in FIG. 22, a plurality of switch units 24 (24-1 and 24-2) that respectively store the ACLs 321 (321-1 and 321-2) may correspond to the single software processing unit 35. As illustrated in FIG. 23, the switch unit 24 may store a plurality of ACLs 321 (321-11 to 321-13). In reference to the plurality of ACLs 321, the ACL 321 used as a reference target may be changed in order by checking the absence of an entry corresponding to the received packet. In addition, the plurality of ACLs 321 may be referred to in parallel.

Figure 24:
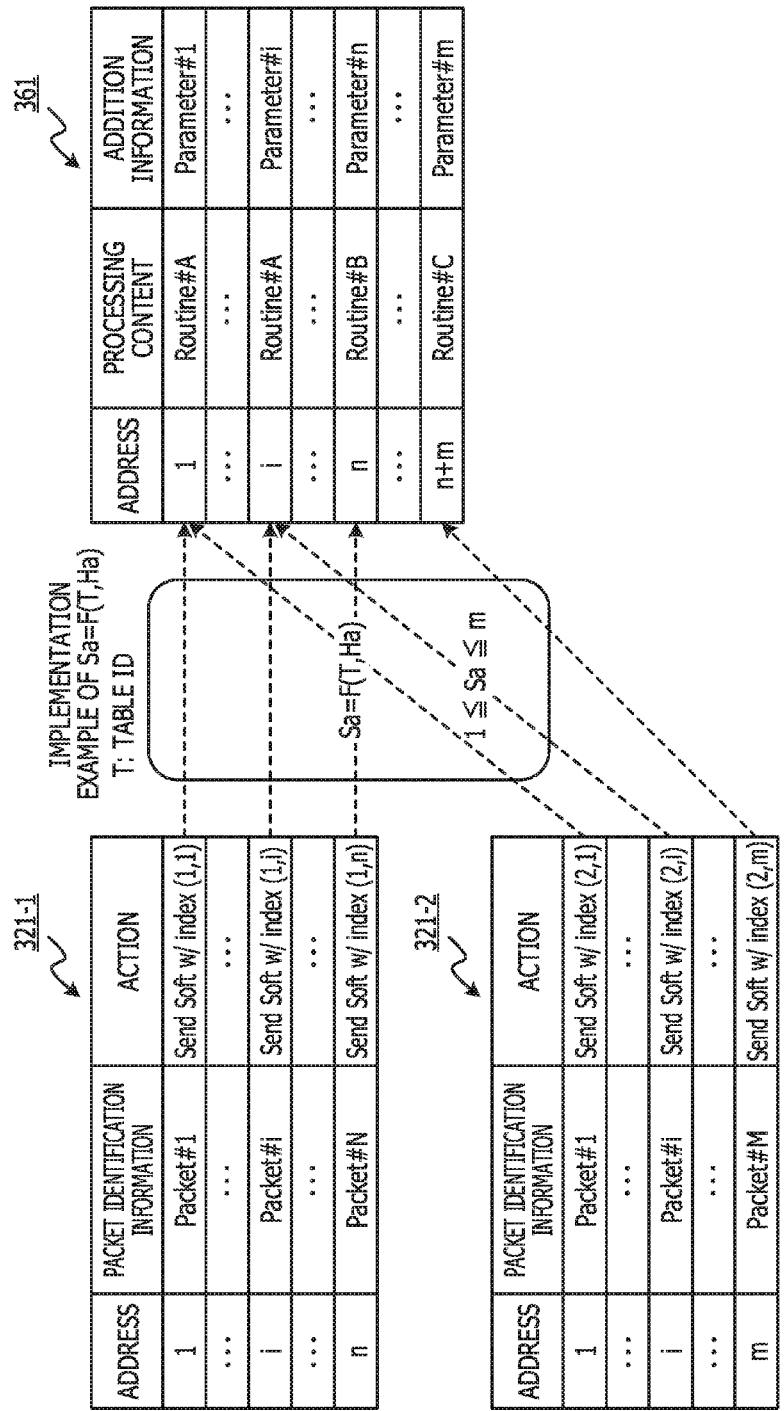
FIG. 24 is a diagram illustrating an indirect mapping method according to a first application example.

In the embodiment, the correspondence relationship between an entry of the ACL 321 and the corresponding entry of the software table 361 is established, "1 to 1". In addition, the entry of the ACL 321 stores index information directly indicating the entry of the software table 361. The index information may be information indirectly indicating the entry of the software table 361. The index information may not be stored in the entry of the ACL 321. That is, the index information indicating the entry of the software table 361 may be generated using at least one of the address value of an entry that has been hit in the ACL 321, data of the received packet, a value that has been calculated using data (for example, a hash value, and hereinafter, a hash value is used for descriptive purposes), and the like. As illustrated in FIGS. 23 and 24, when there exists the plurality of ACLs 321, identification information assigned to the ACL 321 (here, referred to as "table ID") may be also used for generation of index information. Hereinafter, a method in which the index information is used as is is referred to as "direct mapping method". A method that results in generation of index information is referred to as "indirect mapping method".

Even when the indirect mapping method is employed, the software processing unit 35 may execute packet processing similar to that of the direct mapping method by causing the switch unit 24 to generate index information. Therefore, the software processing unit 35 may execute the packet processing within a processing time close to that of the direct mapping method.

FIG. 24 is a diagram illustrating an indirect mapping method according to a first application example. The example illustrated in FIG. 24 is an example in which index information is generated using a calculation expression "index information=F (x)". As a case, for example, the modification illustrated in FIG. 22, that is, the case in which the two ACLs 321-1 and 321-2 are used as targets is used. In FIG. 24, "Sa" indicates index information, and "T" indicates a table ID, and "Ha" indicates the address value of an entry that has been hit in the ACL 321.

In the example illustrated in FIG. 24, it is assumed that a relationship of "m>n" is established by setting the number of entries in the ACL 321-1 as "n", and setting the number of entries in the ACL 321-2 as "m". Entries having the address values "1 to n" in the ACL 321 respectively correspond to entries having the address values "1 to n" in the software table 361, "1 to 1". Entries having the address values "n+1 to m" in the ACL 321-2 respectively correspond to entries having the address values "n+1 to m" in the software table 361, "1 to 1". As a result, the value range of a function F (T,Ha) that is, the range of calculated index information Sa corresponds to "1≤Sa≤m". In FIG. 24, a relationship of "1<i<n" is satisfied.

A variable used for the calculation of the index information Sa may be stored in each of the entries of the ACL 321. Here, "index (1, 1)", "index (1, i)", and the like illustrated in FIG. 24 indicate information used for the calculation of the index information Sa as variables. The information may be used instead of the address value or the like of a hit entry. Alternatively, the information may be used as one of variables to be added.

Figure 25:
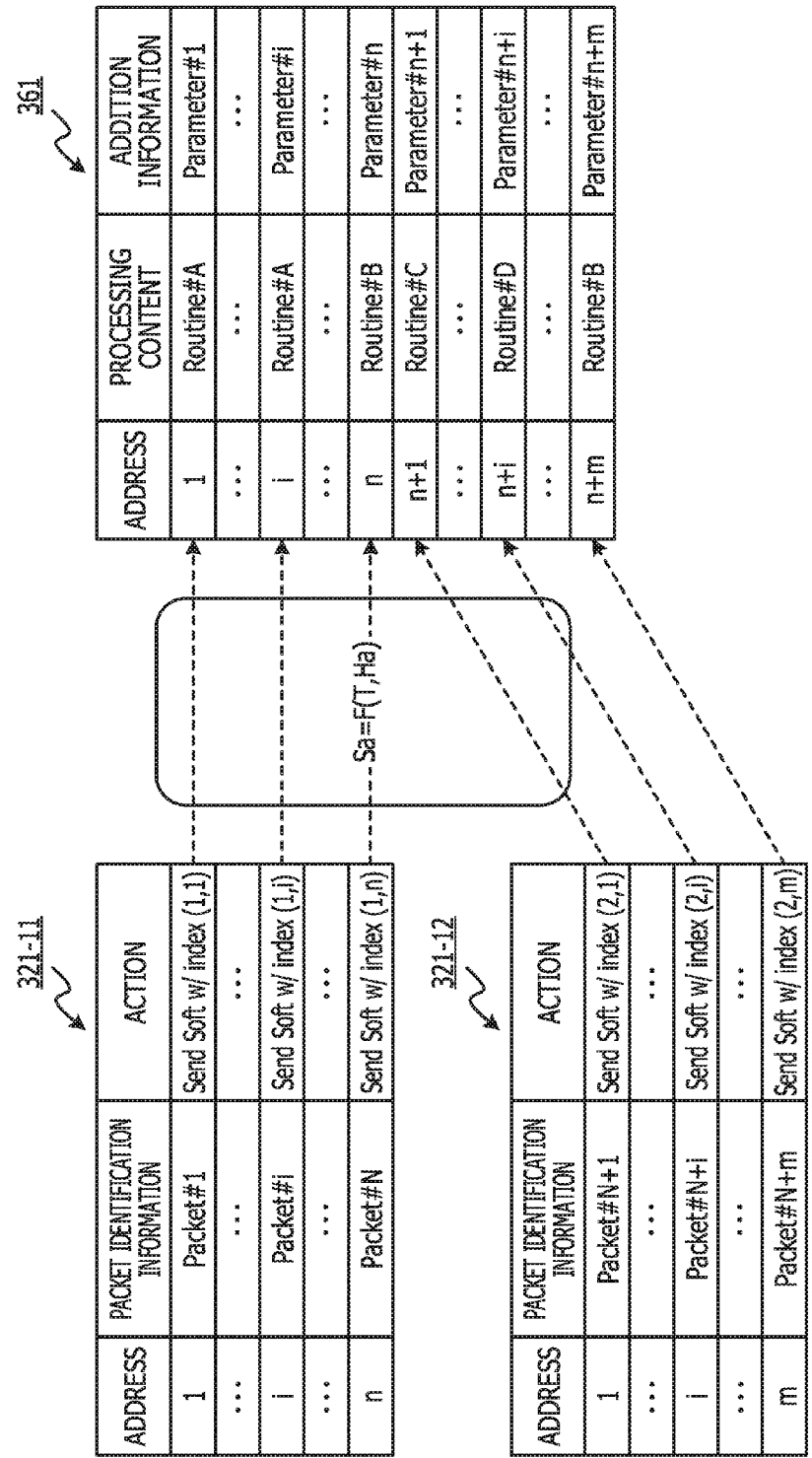
FIG. 25 is a diagram illustrating an indirect mapping method according to a second application example.

FIG. 25 is a diagram illustrating an indirect mapping method according to a second application example. The example illustrated in FIG. 25 is also an example in which index information is generated using the calculation expression "index information=F (x)". As a case, for example, the modification illustrated in FIG. 23 is used. Here, for convenience, as the ACLs 321, the two ACLs 321-11 and 321-12 are merely assumed.

In the example illustrated in FIG. 25, the number of entries in the ACL 321-11 is set as "n". The number of entries in the ACL 321-12 is set as "m". All of the entries in each of the ACLs 321 are caused to correspond to different entries in the software table 361, "1 to 1". Therefore, the value range of the function F (T,Ha), that is, the range of the calculated index information Sa corresponds to "1≤Sa≤n+ m". Even in the application example illustrated in FIG. 25, a variable used for calculation of the index information Sa may be stored in an entry of each of the ACLs 321.

Figure 26:
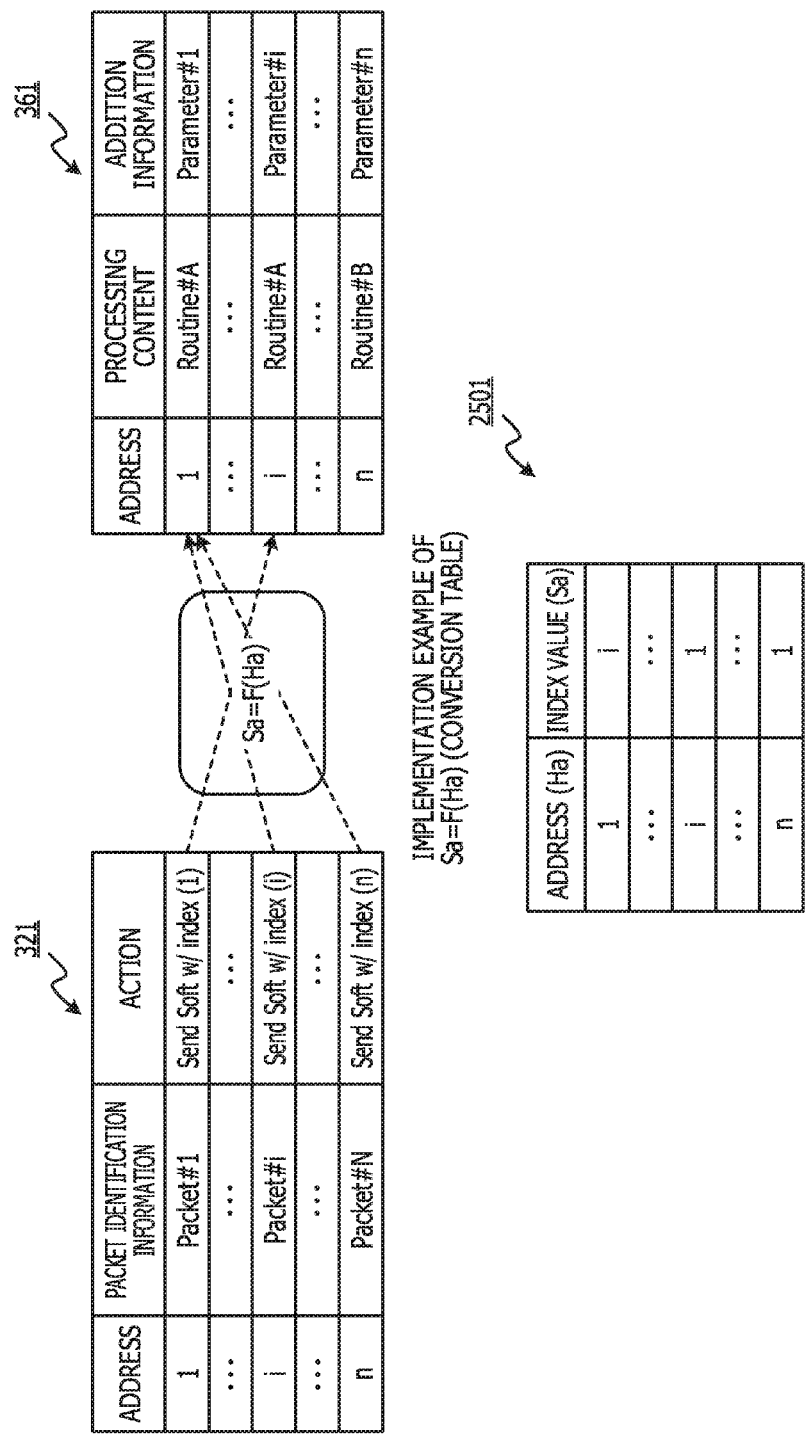
FIG. 26 is a diagram illustrating an indirect mapping method according to a third application example.

Even in the embodiment, and in each of the application examples illustrated in FIGS. 24 and 25, a correspondence relationship between each an entry of the single ACL 321 and the corresponding entry of the software table 361 is established, "1 to 1". As illustrated in FIG. 26, the correspondence relationship of many-to-one may be established. When the correspondence relationship of many-to-one is established, an entry may not be added to the software table 361 due to addition of an entry to the ACL 321.

In the example illustrated in FIG. 26, it is assumed that the address value Ha of a hit entry is merely used for the calculation of the index information Sa. The index information Sa may be obtained using a conversion table 2501 in which the index information Sa corresponding to the address value Ha has been defined. The obtaining of the index information Sa using a conversion table such as the conversion table 2501 may be applied to the application examples as illustrated in FIGS. 24 and 25. Even in the application example illustrated in FIG. 26, information used instead of the address value Ha or combined with the address value may be stored in each entry of the ACL 321.

In the embodiment, as the packet processing device, the gateway 2 is used. However, an applied packet processing device having a type different from that of the gateway 2 may be applied. Any type of a packet processing device may be applied to the embodiment widely as long as a packet processing device achieves the function using software processing.

Various modifications may be applied in addition to the above-described examples.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method executed by a first processor and a second processor included in a packet processing device, the control method comprising:

receiving, by the first processor, a packet that includes identification information;

calculating a first value using some pieces of data included in the received packet;

searching first execution information corresponding to the first value from among a plurality of first execution information stored in a first memory, the plurality of first execution information respectively including the identification information of the received packet and processing that is to be executed for the received packet;

transmitting specification information indicating processing that is to be executed, included in the identified first execution information together with the received packet, to the second processor, when the specification information corresponding to the first value is specified by the searching and when the specification information specifies processing by the second processor;

receiving, by the second processor, the specification information and the received packet; and executing a processing corresponding to the received specification information by referring to a second memory that stores second execution information in which specification information of a certain processing, a processing content, and addition information including one or more parameters used for the certain processing are associated with each other for each of a plurality of specification information.

2. The control method according to claim 1,
wherein the some pieces of data is a destination physical address.

3. The control method according to claim 1, further comprising:

calculating, by the first processor, a second value which is different from the first value using predetermined data included in the received packet;

transmitting the second value together with the received packet, when the specification information corresponding to the first value is not specified by the searching; and executing a processing corresponding to the second value by referring to the second memory that stores the second execution information.

4. The control method according to claim 1,
wherein the predetermined data is a destination network address, a transmission source network address, a destination port number, or a transmission source port number.

5. The control method according to claim 3,
wherein the second execution information is updated by deleting processing information that is to be deleted when an amount of processing information included in the second execution information reaches to an upper limit value.

6. A packet processing device, comprising:
a first processor; and
a second processor,
wherein the first processor is configured to:
receive a packet that includes identification information,
calculate a first value using some pieces of data included in the received packet,
search first execution information corresponding to the first value from among a plurality of first execution information stored in a first memory, the plurality of first execution information respectively including the identification information of the received packet and processing that is to be executed for the received packet, and
transmit specification information indicating processing that is to be executed, included in the identified first execution information together with the received packet, to the second processor, when the specification information corresponding to the first value is specified by the searching and when the specification information specifies processing by the second processor, and
wherein the second processor is configured to:
receive, by the second processor, the specification information and the received packet, and execute a processing corresponding to the received specification information by referring to a second memory that stores second execution information in which specification information of a certain processing, a processing content, and addition information including one or more parameters used for the certain processing are associated with each other for each of a plurality of specification information.

7. The packet processing device according to claim 6, wherein the some pieces of data is a destination physical address.

8. The packet processing device according to claim 6, wherein the first processor is configured to:
calculate a second value which is different from the first value using predetermined data included in the received packet, and
transmit the second value together with the received packet, when the specification information corresponding to the first value is not specified by the searching, and
wherein the second processor is configured to
execute a processing corresponding to the second value by referring to the second memory that stores the second execution information.

9. The packet processing device according to claim 6, wherein the predetermined data is a destination network address, a transmission source network address, a destination port number, or a transmission source port number.

10. The packet processing device according to claim 8, wherein the second execution information is updated by deleting processing information that is to be deleted when an amount of processing information included in the second execution information reaches to an upper limit value.

11. A non-transitory computer-readable recording medium including a program that causes a first processor and a second processor included in a packet processing device to execute a process, the process comprising:
receiving, by the first processor, a packet that includes identification information;
calculating a first value using some pieces of data included in the received packet;
searching first execution information corresponding to the first value from among a plurality of first execution information stored in a first memory, the plurality of first execution information respectively including the identification information of the received packet and processing that is to be executed for the received packet;
transmitting specification information indicating processing that is to be executed, included in the identified first execution information together with the received packet, to the second processor, when the specification information corresponding to the first value is specified by the searching and when the specification information specifies processing by the second processor;
receiving, by the second processor, the specification information and the received packet; and
executing a processing corresponding to the received specification information by referring to a second memory that stores second execution information in which specification information of a certain processing, a processing content, and addition information including one or more parameters used for the certain processing are associated with each other for each of a plurality of specification information.

12. The recording medium according to claim 11, wherein the some pieces of data is a destination physical address.

13. The recording medium according to claim 11, wherein the process further comprising:
calculating, by the first processor, a second value which is different from the first value using predetermined data included in the received packet;
transmitting the second value together with the received packet, when the specification information corresponding to the first value is not specified by the searching; and
executing a processing corresponding to the second value by referring to the second memory that stores the second execution information.

14. The recording medium according to claim 11, wherein the predetermined data is a destination network address, a transmission source network address, a destination port number, or a transmission source port number.

15. The recording medium according to claim 13, wherein the second execution information is updated by deleting processing information that is to be deleted when an amount of processing information included in the second execution information reaches to an upper limit value.

* * * * *